United States Patent [19]

Lounsbury et al.

[11] Patent Number: 4,637,023
[45] Date of Patent: Jan. 13, 1987

[54] DIGITAL DATA ERROR CORRECTION METHOD AND APPARATUS

[75] Inventors: David M. Lounsbury, Boston; Alexander J. Stevenson, Framingham, both of Mass.

[73] Assignee: Prime Computer, Inc., Natick, Mass.

[21] Appl. No.: 466,333

[22] Filed: Feb. 14, 1983

[51] Int. Cl.$^4$ .............................................. G06F 11/10
[52] U.S. Cl. ....................................... 371/38; 360/53; 371/13
[58] Field of Search ................. 371/13, 32, 38; 360/53

[56] References Cited

U.S. PATENT DOCUMENTS

| | | | |
|---|---|---|---|
| 3,231,859 | 1/1966 | Oliari | 371/13 |
| 3,273,120 | 9/1966 | Dustin et al. | 371/13 |
| 3,381,272 | 4/1968 | Pasini | 371/32 |
| 3,449,718 | 6/1969 | Woo | 371/32 |
| 3,456,239 | 7/1969 | Glasson | 371/32 |
| 3,473,150 | 10/1969 | McClelland | 371/32 X |
| 3,771,125 | 11/1973 | Nagahori et al. | 371/13 |
| 4,292,684 | 9/1981 | Kelly et al. | 371/38 |
| 4,439,859 | 3/1984 | Donnan | 371/32 |

Primary Examiner—Charles E. Atkinson
Attorney, Agent, or Firm—Wolf, Greenfield & Sacks

[57] ABSTRACT

Controller circuitry for a serially-recording magnetic tape drive which is capable of correcting writing errors by rewriting the portions of the data which have been erroneously recorded. Write circuitry in the controller breaks a conventional data record up into one or more blockettes, each of which is assigned a unique sequential blockette number which is recorded on the tape along with the data. After each blockette has been serially recorded sequentially by blockette number on the tape, it is immediately read to check whether it has been properly recorded on the tape. If the blockette has been recorded improperly, the read process directs the write circuitry to rerecord the blockette information at the tape position then under the write head. The recorded blockettes may be out of sequential order since the rerecorded blockette may be located several blockettes after its initial erroneous writing. The data is placed back in sequential order by the read process. As blockettes are read from the tape, they are placed in a buffer memory in the controller. The read circuitry then transfers the data to the host computer system in the order specified by the blockette number and therefore reconstructs the data even if blockettes have been rewritten out of sequence.

43 Claims, 21 Drawing Figures

GOOD RECORD (NO ERROR)

ISOLATED BLOCKETTE ERROR

MULTIPLE BLOCKETTE ERROR

DIGITAL DATA ERROR CORRECTION METHOD AND APPARATUS

FIELD OF THE INVENTION

This invention relates to digital data error correction apparatus and more particularly to error correction apparatus for correcting recording errors on serially recorded magnetic recording tape.

BACKGROUND OF THE INVENTION

Present day computer systems store digital data in a variety of storage devices including magnetic tape drives, magnetic disk drives and semiconductor memories. To permit the computer system, which is usually called the "host" system, to operate with these storage devices, an interface circuit called a "controller" is connected between the storage device and the computer. The controller receives coded commands from the host system and translates these commands into the various signals which are needed to physically operate the storage device to allow it to store and retrieve data. In order to relieve the host computer from as much of the routine "bookkeeping" tasks as possible, the controller circuit may also perform format conversion by converting the data from the form in which it is stored in the storage device into a form which is used in the computer. Some controller circuits also perform error detection and correction.

The functions performed by the controller circuitry obviously vary depending on the class of storage device to which it is connected. For example, data to be stored must often be converted between the parallel form used internally in the computer and the serial form used in some magnetic tape drives and disk storage units. Even if the controller is to operate with a single class of storage device, the operation of the controller is so intimately associated with the operation of the associated device that the functions and operation of the controller circuitry may depend on the particular characteristics of the device. For example, there are several different types of magnetic tape drives in present use.

One conventional magnetic tape drive called a "start/stop" drive utilizes motor-driven capstans and pinch rollers to maintain a constant tape speed. The motor drives which run the capstans are often controlled by sophisticated servomechanisms and can quickly accelerate and decelerate the tape so that it can be brought to any desired location.

Another type of magnetic tape drive which is commonly used is called a "bit streaming" drive. With this type of drive there is no servomechanism, rather the tape is moved by a less precisely controlled motor. Bit streaming systems, although much less expensive than start/stop servo-controlled drives, have the characteristic that the tape cannot be speeded up quickly to its operating speed nor can it be decelerated quickly to a stop. Therefore, when data is to be written or read from the units the tape must be gradually accelerated to operating speed, the data written and then the tape allowed to coast to a stop. Typically, the accelerating and decelerating portions of the writing cycle are of such length that several blocks or pieces of data may pass by the reading or writing head before the system is running at a stable speed and is ready to operate.

It is desirable to have one controller circuit which can operate with both start/stop drives and bit streaming drives. However, a controller circuit which is to operate with both of these types of tape drives must be able to accomodate the differences in operation. Most prior art tape controllers have not been able to operate satisfactorily with both start/stop drives and bit streaming drives because conventional tape controllers have been unable to perform error correction while the tape is moving ("on-the-fly" error correction). In start/stop drives the tape can be positioned accurately to correct errors, but in bit streaming devices it is often impossible to stop the tape to correct errors because by the time the tape coasts to a stop, the portion of the tape which contains the errors is usually several blocks past the read and write head area. Therefore with bit streaming tape drives error correction had to be performed by the computer itself causing a large amount of processing time to be devoted to error correction.

It is therefore an object of the present invention to provide a tape drive controller which will operate satisfactorily with either start/stop drives or bit streaming tape drives.

It is another object of the present invention to provide a tape drive controller which can perform error correction "on-the-fly".

It is yet another object of the present invention to be able to perform "on-the-fly" error correction with both start/stop tape drives and bit streaming tape drives.

It is a further object of the present invention to provide a tape controller which does not require a large amount of software overhead in the host computer.

It is still another object of the present invention to provide a tape drive controller which can be constructed from readily available components.

SUMMARY OF THE INVENTION

The foregoing objects are achieved and the foregoing problems are solved in one illustrative embodiment of the invention in which tape controller apparatus corrects recording errors by rewriting the portions of the data which have been erroneously recorded. The illustrative write circuitry divides a conventional magnetic tape data record into a plurality of "blockettes" each of which is delimited on the tape by special flag signals and each of which is assigned a unique sequential blockette number that is also recorded on the tape along with the data.

More particularly, the tape controller circuitry divides the data record into blockettes by transferring the data obtained from the host computer into one or more buffer memories of predetermined length. The buffer memories are "connected" in a sequentially-ordered chain by address pointers and when the data is transferred to a buffer memory it is assigned a blockette number in the same sequential order.

Recording of the blockette information onto the tape is controlled by a counter which contains a number indicating the blockette number of the next blockette in the sequential series to be written to the tape. After each blockette has been written on the tape, read circuitry immediately reads the recorded blockette information to determine whether it has been recorded properly. The counter is incremented by the read circuitry if a blockette has been properly recorded. If the blockette has not been properly recorded, the counter is decremented, causing the write circuitry to rerecord the blockette information so that a second copy of the blockette is written on the tape. The rerecording process continues until the blockette information is properly recorded on the tape.

If the read circuitry determines that the next sequential blockette has been recorded with errors, after the initial decrementing of the acknowledge counter by the read circuitry, the counter is alternately incremented. Subsequent erroneous recordings cause the acknowledge counter to be alternately incremented and decremented, causing pairs of blockettes to be rewritten into the tape until the blockettes have been properly recorded.

The read circuitry which retrieves information from the tape reads blockettes from the tape and stores them in the internal buffer memories in the controller circuitry. Prior to sending each blockette to the host computer the read circuitry checks to see if the blockette has been validly recorded by examining an error correcting code which is stored along with the blockette data. Validly recorded blockettes are sent to the host computer in sequential order specified by the blockette numbers. Therefore, even if the blockettes are out of sequential order when recorded on the tape, they are placed back in sequential order by the reading circuitry in accordance with the blockette numbers. Proper data order is therefore maintained.

DETAILED DESCRIPTION

One problem with prior art magnetic tape controllers is that they have been unable to properly correct recording errors "on-the-fly". One reason for this is that most prior art controllers have been able to work only with complete magnetic tape data records. Accordingly, when an error occurred during recording of the data record the entire record had to be rewritten. Since data records can be quite large it was necessary to either provide a large amount of storage within the controller or require retransmission of the data record from the host computer.

In accordance with one aspect of the invention, a conventional data record is broken into a plurality of smaller data pieces called "blockettes". The blockettes can be assembled in sequential order to reconstruct the original data record. To ensure that the data blockettes can be assembled in the proper order, each blockette is assigned a unique sequential number which is recorded immediately prior to the data in that blockette.

Figure 1:
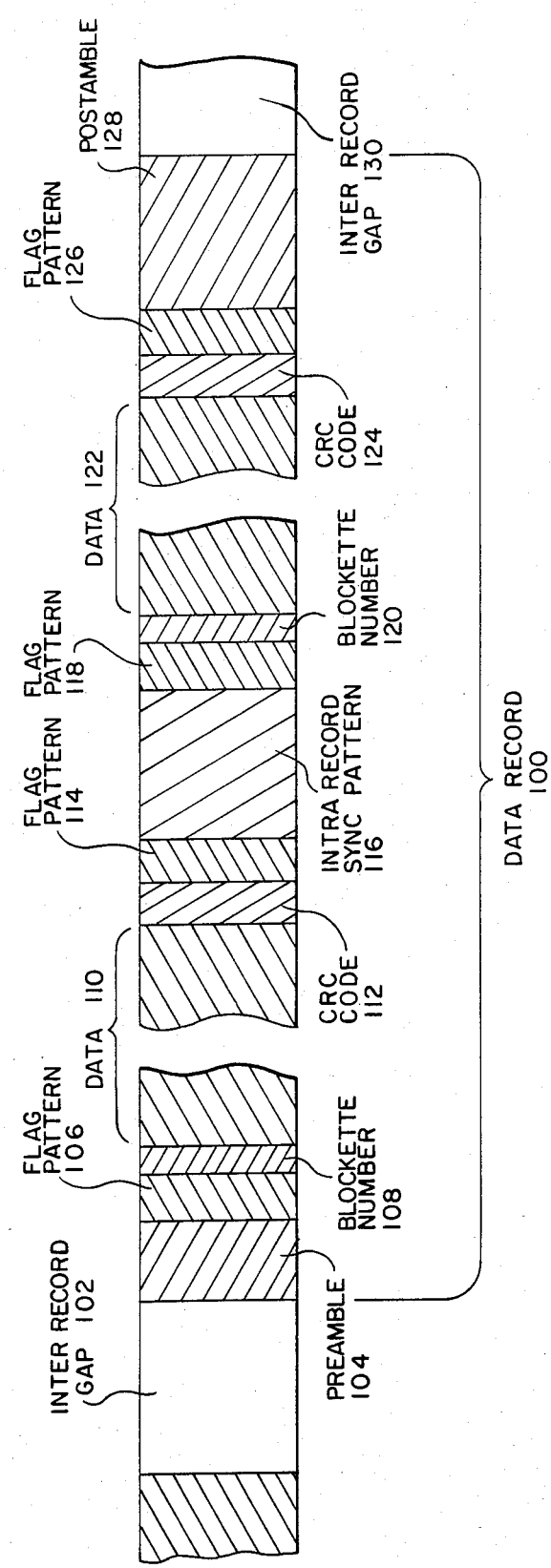
FIG. 1 of the drawing is a diagram of the error correcting data format used with the present invention.

FIG. 1 shows the arrangement of a conventional data record 100 which might be found on one track of a magnetic tape, which data has been broken into blockettes for use with the illustrative error correcting apparatus. Data record 100 consists of only two "blockettes" but as many as 128 can be used in the illustrative embodiment. The blockette information including the blockette number and data are recorded in a synchronous format of the type which is usually used in data communication channels. One format which is suitable for use with the illustrative embodiment is the conventional SDLC (Synchronous Data Link Communication) channel format.

In order to operate with the SDLC format, the controller must include circuitry which is capable of decoding a synchronous code. Such controller circuitry is described in detail hereinafter.

Data record 100 is separated from other records on the tape track by interrecord gaps 102 and 130. These gaps are completely erased and contain no digital data information. The division of the data into records separated by blank gaps is a conventional method of arranging data on magnetic tape, however, the arrangement of the data within the record is in accordance with the present invention.

Specifically, each record begins with a preamble 104. The exact nature of this preamble is dependent on the type of reading circuitry which is used to retrieve information from the tape. The preamble usually consists of a repetitive pattern of digital bits which are used by a phase-locked loop or other similar circuitry in the reading mechanism synchronized with the data on the tape. A preamble suitable for use with the illustrative consists of forty (five bytes) binary "0"s.

The preamble is followed by a flag pattern 106. As with the preamble, this pattern consists of a unique code which prepares the reading circuitry to read the control information and data following flag pattern 106.

The flag code is the pattern "01111110". This is a unique code which cannot be found in normal data patterns due to a well-known process known as "bit stuffing" in synchronous communications. When data is written using this process, the writing circuitry which generates the preamble, flag and data encoding patterns automatically inserts an extra binary "0" after each group of five consecutive binary "1"s in the blockette number fields (108, 120), the data fields (110, 122) and the CRC fields (112, 124). When bit-stuffed code produced by writing circuitry of this type is read the reading circuitry automatically removes the "0" following a group of five consecutive binary "1"s thereby ensuring that the data pattern, as read, corresponds to the data pattern as written. The presence of the inserted bits however, ensures that the reading circuitry will recognize a code of more than five consecutive "1"s as a special flag code.

Flag pattern 106 typically consists of three consecutive bytes of the flag code discussed above and is detected by the reading circuitry to prepare the circuitry for receiving the blockette number 108 which follows.

Flag pattern 106 is followed by the blockette number 108 which identifies the position of the blockette relative to other blockettes within the data record. The blockette numbers for the blockettes within a single data record start with "one" and increase consecutively for each blockette within the data record, although the blockettes may be written out of order on tape.

Following blockette number 108 is the data 110 contained in the first blockette of data record 100. Data 110 may consist of between 1 and 256 bytes of data. In accordance with conventional practice the data in the illustrative embodiment is written with the most significant bit first relative to the tape motion.

Following the data is a CRC check code 112. This is a two byte error detecting code which is generated by well-known circuitry in accordance with conventional techniques. Following the CRC check code 112 is an additional flag pattern 114 which may be the same as flag pattern 106. Flag pattern 114 is used to signal the end of the data and constitutes the end of the first blockette.

Between blockettes there is an intrarecord synchronization pattern 116 which may consist of the same bit pattern of forty "0"s as preamble 104. The intrarecord synchronization pattern is used to resynchronize the reading circuitry so that it can begin reading the second blockette.

Following the intrarecord synchronization pattern 116 is an additional flag pattern 118 which may be the same as flag patterns 106 and 114. This additional flag pattern signifies that the blockette number 120 is to follow. Following blockette 120 is the second section of data 122 which again may be between 1 and 256 bytes in length.

A conventional CRC check code 124 follows data 122 as in the first blockette. A final flag pattern 126 is provided to signify the end of the data and a postamble 128 is added to complete data record 100. Postamble 128 is the same as preamble 104 in that it consists of forty "0"s. Postamble 128 allows the record to be read in the reverse direction. Following record 100 is an additional interrecord gap 130 which separates it from a following record.

Figure 1A:
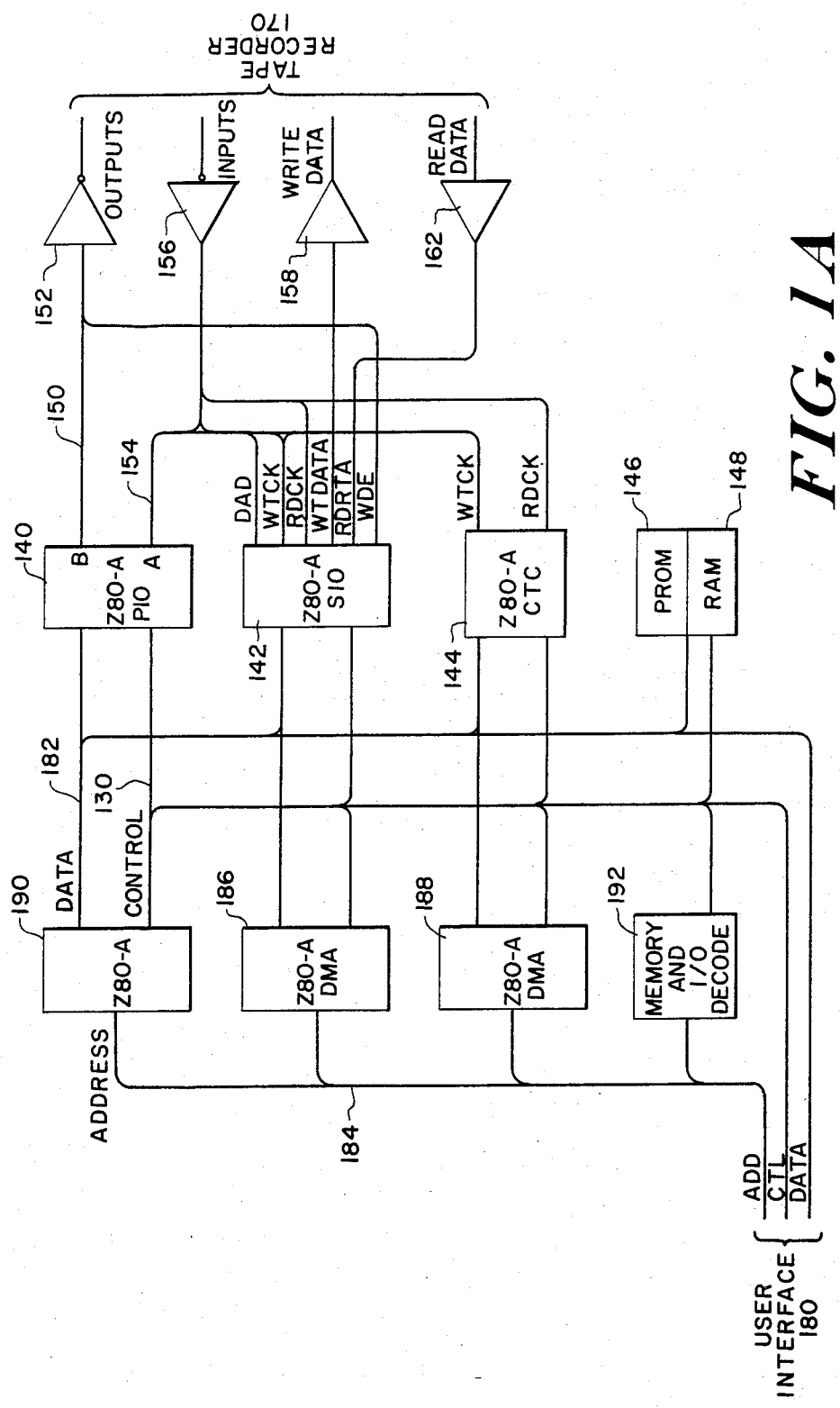
FIG. 1A shows a block schematic diagram of the illustrative tape controller.

FIG. 1A shows a block schematic diagram of the inventive tape controller which is inserted between a host computer system and a magnetic tape drive which might be of the start/stop type or of the bit streaming type. The details of the computer system and of the tape drive form no part of the present invention and therefore will not be discussed further herein.

The controller circuitry connects to the host computer system by means of user interface 180 and to the tape drive by means of interface 170. User interface 180 is usually connected to a computer through a peripheral or input/output bus and associated bus interface circuitry. This circuitry is conventional and is not shown for clarity.

The host computer provides commands in the form of data (over the data bus 182) which commands are processed and converted by the controller's microprocessor to produce data, address and control signals suitable for operating the controller and controlling the tape drive. Although address bus 184 is shown in FIG. 1A as a single line, it actually consists of multiple wires, each of which carries a single signal. The number of wires in the bus depends on the particular microprocessor configuration used. In the illustrative embodiment, the address bus has sixteen lines. Similarly, the control bus consists of seven multiple lines. Data to be stored on the tape or data retrieved from the tape passes between the controller and the host computer by means of data bus 182 which, illustratively, has eight multiple lines.

Interface 170 is also conventional and allows transfer of data and control information from the controller circuitry to the associated tape drive. Read data passing from the tape drive to the controller circuitry is transferred through receiver 162. Similarly, write data passing from the controller to the tape drive is transferred through driver 158. Control signals passing between the tape drive and the controller pass through receivers 156 and driver 152, respectively. Drivers/receivers 152-162 are conventional signal drivers/receivers.

In accordance with one aspect of the invention, the data passing between the host computer and the tape drive is not transmitted directly through the controller. Instead the data is temporarily stored in an internal buffer memory. To achieve efficient data flow through the controller circuitry, data transfers to and from the memory are controlled by separate direct memory access circuits operating independently but coordinated by the central processing unit.

More particularly, data passing through the controller is temporarily stored in internal random access memory 148. The size of this memory depends on the amount of data which must be stored to achieve error detection and correction but typically only a few Kbytes would be necessary. A memory suitable for use with the illustrative embodiment is a 4 Kbyte semiconductor random access memory (RAM) manufactured by the Hitachi Corporation part number HM6116 (this part is a 2 Kbyte RAM, two are used).

Control of data flow from user interface 180 to Ram 148 is accomplished by direct memory access (DMA) unit 186. DMA unit 186 is a well-known circuit which generates control and gating signals to transfer information from a memory to a designated port. The DMA circuitry is such that, after an initial selection and enabling by the central processing unit, no further intervention by the CPU is necessary to effect the transfer. In particular DMA circuitry 186, upon being selected by the central processing unit, reads data from interface 180 and transfers the data to memory 148. The operation of a DMA circuit in this manner is well-known. A direct memory access unit suitable for use with the illustrative embodiment is a Z80 Direct Memory Access Controller, Model Z8410, manufactured by Zilog, Inc., 10340 Bubb Rd., Cupertino, Calif. 95014. The operation and use of the Zilog Z8410 unit is explained in detail in the Data Book for Z80 devices published by Zilog, Inc.

From RAM 148 information can be transferred over data bus 182 to serial input/output (SIO) controller 142 and from there to the tape drive, via interface 170, as will be hereinafter described. Specifically, transfers from memory 148 over data bus 182 to SIO unit 142 are controlled by DMA unit 188 which may illustratively be the same as DMA unit 186.

The operation of DMA units 186 and 188 is in turn coordinated by central processing unit 190 which may be any suitable microprocessor unit with sufficient speed for implementing the error correction algorithms. Processor 190 which may illustratively be a Z80-A Central Processing Unit, Model Z8400, manufactured by Zilog, Inc. Processor 190 oordinates the operation of all units, including the memory 148, in the controller circuitry either enabling or disabling the units by asserting of negating signals provided to the units' chip select (CS) inputs or chip enable (CE) inputs. The enabling signals are generated by memory and I/O decode circuit 192. This circuit receives selected address signals (address bits 2-7) from CPU 190 over address bus 184, decodes the signals and generates the appropriate enabling signal.

In accordance with the invention, the operation of DMA controllers 186 and 188 is independent in that both controllers may simultaneously be running transfer cycles. Since there is only one common data bus, however, physically only one transfer either into or out of memory 148 can take place at any time. The DMA units are constructed to take control of the system address and data buses during a transfer so that they can properly allocate the transfer time between them without intervention from the central processing unit. The units operate concurrently with CPU 190 by cycle-stealing memory and I/O read/write cycles in a well-known manner.

The use of two DMA controllers allows overlap in the transfer of information between user interface 180 and the tape drive interface 170. In particular, under control of DMA unit 186, a blockette of information can be transferred from user interface 180 to memory 148. Processor 190 then signals DMA unit 188 to begin transfer of the blockette of information to the serial input/output unit 142. At the same time microprocessor 190 signals DMA 186 to start the transfer of a new blockette of data into a different location in memory 148. Thus, as information is being transferred out of memory 148 information is also being transferred into memory 148. Accordingly, memory 148 may be configured as a plurality of buffer locations.

Also associated with memory 148 is a programmable read only memory (PROM) 146 which contains the operating software for the processor 190. This memory can also be enabled by memory and I/O decode circuit 192. For the illustrative controller, memory 146 can be approximately 4 Kbytes in size.

Information to be transferred from memory 148 to the tape drive interface 170 is first sent to serial input/output unit (SIO) 142. This is a well-known circuit device which is conventionally used with synchronous data communication channels. A unit suitable for use in the illustrative embodiment is Z80 Serial Input/output Controller Model Z8440/2 manufactured by Zilog, Inc. The operation and programming of this unit is set forth in detail in the data book for the SIO unit published by Zilog, Inc.

In the illustrative embodiment, SIO unit 142 functions to detect data coming into the controller from the tape drive, provide serial-to-parallel and parallel-to-serial conversion between the parallel data on the data bus 182 and the serial data coming from the tape, provide formatting of the data, and error checking.

In accordance with another aspect of the invention, SIO unit 142 may be programmed to format data passing through the controller in the above-described synchronous byte-oriented format which provides for easy error detection and correction of errors "on-the-fly". Since the SIO unit is capable of performing the formatting operations without intervention by the CPU, the amount of software overhead necessary for implementing this data format is minimal.

SIO unit 142 formats the data as specified above by generating the synchronization field, framing the data and generating and checking the CRC code. It also performs bit stuffing in the blockette number, data and CRC fields as discussed above. SIO 142 also detects data errors (dropouts) by monitoring the data detect signal (DAD signal) and controls the write head for writing data by generating a write enable signal (WDE signal). These operations are performed by programming the SIO unit in a conventional manner as set forth in the above-referenced data book which explains the operation of the SIO unit. Data is synchronously clocked into and out of the SIO by read and write clock signals (RDCK and WTCK) sent from the tape drive over interface 170.

The use of blockettes and blockette numbers allows portions of a data record to be rewritten at following locations on the tape if there is an error during writing. When the blockettes are later read by the inventive controller apparatus they are temporarily stored in buffer memory 148. Subsequently the blockettes are read out of memory 148 in the order specified by the blockette numbers, thereby reconstructing the original data even in the presence of errors.

Also included in the illustrative controller circuitry is a parallel input/output controlelr (PIO) 140. This is a conventional unit, which may illustratively by a Z80 Parallel Input/output Controller, Model Z8420, manufactured by the Zilog Corporation. This device provides an interface between the tape drive and the central processing unit 190. In operation, the input/output controller 140 receives data and commands from CPU 190 and generates address and control the speed and direction of motion of the selected tape drive. These signals are generated in a conventional manner as explained in the data book describing the Zilog PIO published by Zilog, Inc.

In addition, PIO unit 140 senses status signals generated by the tape drive and generates interrupt signals which interrupt the operation of the CPU in a well-known manner to inform the CPU unit of certain conditions occuring in the tape drive. PIO unit also monitors end-of-frame signals generated by SIO unit 142 and end-of-data signals generated by the user.

The final piece of apparatus included in the illustrative controller circuitry is a counter time circuit (CTC) 144. This circuit is also a well-known circuit device which generates timing and control signals under control of CPU 190. A device suitable for use with the illustrative embodiment is a Z80 counter Timer Circuit, Model Z8430, manufactured by the Zilog Corporation. CTC unit 144 contains four counters and timers that can be programmed by the CTC unit 190 to provide counting and timing operations such as counting read and write strobes and providing a real-time clock for operation of the controller. In operation, CTC 144 receives a start signal from CPU 190 and counts down to a predetermined number. At this point it generates an interrupt which indicates to the CPU 190 that a predetermined time limit has been reached. CTC 144 then automatically relodds a predetermined "time constant" and resumes counting down again. The unit is used to eliminate extra software which would be necessary to provide timing operations.

The illustrative controller circuitry described above allows the data to be written and read in accordance with routines set forth in detail hereinafter. During a write operation, blockettes are sequentially recorded on the tape. Shortly after the write operation of the first blockette begins, the information being recorded on the tape is checked for proper recording by a read head located a short distance away from the write head. The read head reproduces the information which has just been written and read circuitry computes a new CRC code from the reproduced information. The new CRC code is compared to the CRC code stored after each blockette and a match indicates proper recording.

Since the read and write heads are separated by a small physical distance, in order to avoid blank spots on the tape writing of the next sequential blockette is started before the read operation of the preceeding blockette is finished. Therefore, by the time the CRC check code for a blockette has been read and a determination has been made that the blockette has been either properly or improperly recorded at least one and possibly more other blockettes will have actually been recorded on the tape before any error correction can take place. However, in accordance with another aspect of the present invention it is immaterial that the blockettes are out of order on the tape because they are placed in order by the read circuitry in accordance with the blockette numbers.

Figure 2:
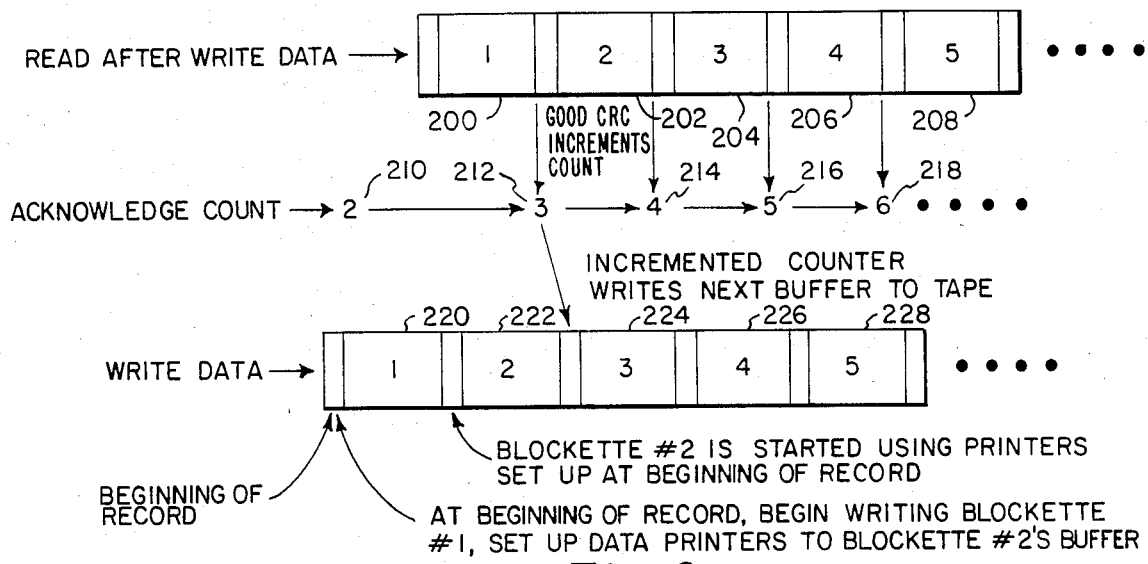
FIG. 2 is a schematic diagram indicating steps performed by the write circuitry in recording a plurality of blockettes on tape during which no recording errors occur.
Figure 3:
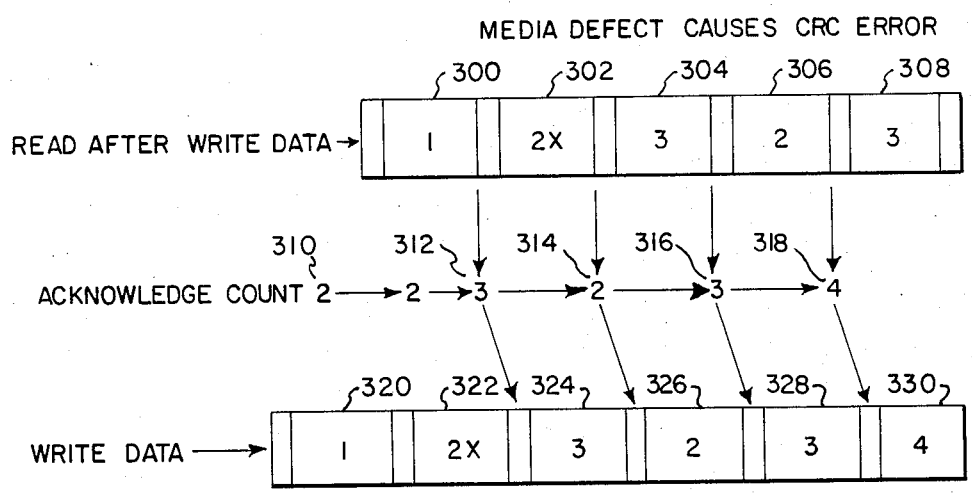
FIG. 3 of the drawing shows, in diagramatic form, the steps performed by the write circuitry in recording a plurality of blockettes in which a recording error occurs in a single blockette.
Figure 4:
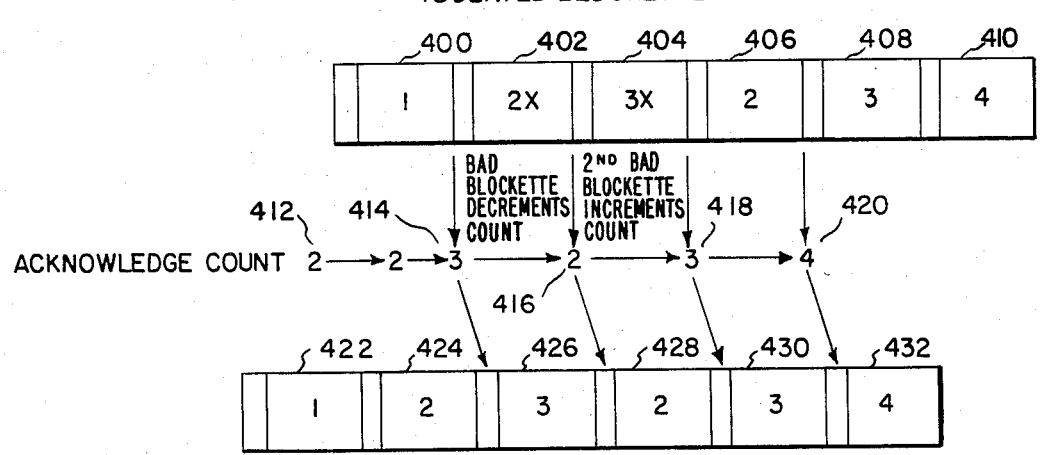
FIG. 4 of the drawing shows the steps performed by the write circuitry in recording a plurality of blockettes in which multiple blockette errors occur during recording.

More particularly, the steps performed by the writing circuitry are set forth in diagrammatic form in FIGS. 2-4. FIG. 2 illustrates the sequence of events occurring during a normal write sequence in which blockettes are properly recorded on the tape. In particular, the two rows of blocks diagrammatically represent blockettes of imformation written on the tape and read from the tape. The lower row of blocks consisting of blockettes 220-228 is a representation of the blockette information as sent to the write circuitry to be written on the tape (time is increasing to the right in FIG. 2). The data in each blockette is schematically represented as a block with a number therein corresponding to the blockette number. As previously mentioned, however, the blockette number is actually contained in a coded portion of the blockette immediately preceding the data. In the representation shown in FIG. 2, blockette 220 is assigned blockette number 1. Similarly, blockette 222 is assigned blockette number 2, blockette 224 is assigned blockette number 3, etc.

The upper row of blocks represents data obtained by the read circuitry which reads the blockette information immediately after it has been written. As with the write data the read-after-write data is represented by blocks with the blockette number therein.

A write operation consists of three separate routines which may overlap in time. These routines, which will be described in detail below, may be performed by the central processing unit in the illustrative controller circuitry shown and described hereinabove.

In the first routine, data is transferred from the host computer system and stored in a memory in the controller circuitry. The memory is divided into a plurality of buffers, each of which can hold blockette data to be written on the tape. The buffers are linked into an endless chain or "ring" by means of "pointer" information located in each buffer which identifies the starting address of the next buffer in the chain. Since the buffers are linked together the read and the write circuitry in the controller can move from one buffer to the next in an orderly fashion in order to read and write data on the tape. Each of the buffers in the controller memory holds up to 256 bytes in the illustrative embodiment.

The data transferred from the host computer is broken into blockettes by loading it into the buffers. As each buffer becomes filled the remaining data is loaded into the next buffer in the buffer chain. When each buffer is filled with data or after all of the data has been transferred from the host computer a blockette number is stored in its appropriate location in the buffer. The loading process continues until all data has been sent to the controller and the host computer system signals that the transfer is complete.

Another routine transfers the information from the buffer memories to the tape writing ciruitry. Blockette information is transferred to the writing circuitry to be "written to the tape" in the order specified by the blockette numbers. The routine begins by setting up a special pointer register to hold the number of the next blockette to be written. At the beginning of the write operation this pointer register is loaded with the address of the buffer which holds the information assigned blockette number 2. In addition, a counter called the "acknowledge counter" is set up with an initial value of two. The routine then selects the buffer containing the information assigned blockette number 1 (blockette 220 in FIG. 2) and begins writing that information onto the tape as shown in the lower row of FIG. 2.

While the first blockette is being written to tape, the value in the acknowledge counter is compared to the blockette numbers contained in the buffers in the buffer ring to determine the next succeeding blockette to be written. After the first blockette has been written to tape, the buffer whose blockette number matches the acknowledge counter is then written on the tape. In this case since the acknowledge counter is set to "two" the buffer with information assigned blockette number "two" (blockette 222) is written to tape.

The third routine involved in the write operation verifies that the blockette data has been properly written onto the tape. As previously mentioned, after a short time interval, the data which has just been written passes over the read head of the tape drive so that it can be read to check for recording errors. As the tape passes over the read head the stored blockette information is read (including the CRC code stored in the blockette). As the blockette information is being read a new CRC code is generated from the recorded information. After the entire blockette has been read, this new CRC code is then compared against the CRC code which has been written along with the blockette information.

If the two CRC codes match, indicating an error-free recording, the acknowledge counter is incremented, in turn, allowing the write routine to write the next sequential blockette to tape. If the CRC code does not match, indicating an error in the writing of the blockette information, an error correction algorithm, as described below, is invoked.

More particularly, sometime after the writing of blockette 220 has begun, the read circuitry begins reading the data recorded on the tape as blockette number 1. The read data appears as blockette information 200. Subsequently, while the read circuitry is in the process of reading blockette number 1, the write circuitry starts writing blockette number 222.

Before the recording of data block number 2 is completed, however, the read circuitry finishes reading blockette 220 and compares the CRC code generated as the data was read to the recorded CRC code. If the two match, the acknowledge counter (which was initially set to "2" as shown in 210) is now incremented at 212 to "3". Therefore, after the write circuitry has finished writing blockette 222, it then begins writing blockette 224 which has been assigned blockette number "3".

At the time the information in blockette 224 is being written, the read circuitry is reading blockette 222 to produce read information 202. After the information in blockette 222 has been read, the CRC code is checked and if good the read circuitry increments the acknowledge counter to "4" as shown in step 214. The write circuitry, when it finishes writing information in blockette 224, will then write information in blockette 226. Operation continues in this manner as long as no errors are detected by the read circuitry.

If an error is detected (indicated by a mismatch in the calculated CRC code and the CRC code stored on the tape) the error correction routine is invoked. The correction routine has two subroutines. The first subroutine corrects an error in an isolated blockette; the second subroutine corrects errors in multiple sequential blockettes.

The events occurring in the case of an isolated error are shown in FIG. 3. The write routine is started as previously described. Specifically, the data pointers and acknowledge counter are set up as described above and the write routine begins writing data in blockette 320 on the tape. Subsequently, the information in blockette 322 is sent to the write circuitry for writing on the tape.

As before, blockette 320 is read by the read circuitry to produce the data shown in blockette 300, the computed CRC code is checked against the stored CRC code and the acknowledge counter is set to "3" as shown in step 312. This step, in turn, causes the information in blockette 324 to be sent to the write circuitry.

However, now assume that the information in blockette 322 has been recorded in error due to a media defect. In this case when the information in block 322 is read the CRC codes will not match, indicating an error. When a mismatch is detected, instead of incrementing the acknowledge counter, the correction routine decrements the acknowledge counter from "3" to "2" as shown in step 314. Therefore, after the write circuitry is finished writing the information in blockette 324 it will rewrite the information in blockette 322 as shown in blockette 326.

While blockette 322 is being rewritten, the read circuitry is reading the information in blockette 324 to produce read information 304. If this information is properly recorded, the acknowledge counter will be incremented by the read circuitry (as shown in step 316) back to 3. The new acknowledge counter value will, in turn, cause blockette 324 to be also rewritten as shown in blockette 328. While blockette 324 is being rewritten, rewritten blockette 326 is being rechecked to produce read data 306.

Assuming that blockette 326 has been recorded properly, the acknowledge counter will be incremented to "4" as shown in step 318 resulting in blockette 330 being written.

Therefore, the occurrence of a single recording error causes a pair of blockettes to be written. In particular, the blockette in which the error occurs is rewritten as well as the blockette following the erroneous blockette. As will be hereinafter described, according to another aspect of the invention, this duplication of blockettes causes no errors when the blockettes are transferred to the host computer system because the inventive read circuitry reassembles the blockettes so that the blockette numbers are sequential and disregards one of a pair of blockettes which has the same blockette number.

The operation of the error correction subroutine in the case of multiple sequential errors is shown in FIG. 4. As with the previous two cases, the read circuitry first begins writing the information in the blockette assigned blockette number "1" (blockette 422). The acknowledge counter is set to 2 as shown in step 412. Subsequently, the read circuitry begins reading the information in blockette 422. Blockette 424 is written in the same manner.

Assume that both blockettes 424 and 426 have been recorded erroneously. In accordance with the previous error correcting routine, when the erroneous information in blockette number 424 is read, the mismatch of the CRC codes causes the acknowledge counter to be decremented as shown in 416, in turn, causing blockette 424 to be rewritten as blockette 428.

The read circuitry then reads blockette 426 producing read data 404. However, the mismatch in CRC codes caused by the errors in recorded blockette 426 does not decrement the count as in the case of an isolated error, but instead increments the acknowledge count as shown in step 418. The new value in the acknowledge counter now causes blockette 426 to be rewritten as shown in blockette 430. While blockette 426 is being rewritten, rewritten blockette 428 is being read to produce read data 406. If the blockette is now properly recorded, the acknowledge counter is incremented to "4" as shown in step 420 and blockette 432 is written. Thus, in the case of multiple errors, pairs of blockettes are rewritten until all of the blockettes have been properly written.

A read operation consists of two routines. One routine reads data from the tape and stores in the buffers.

The other routine transfers data in the buffers to the host computer system.

The tape-to-buffer read routine first scans the four buffers to find one that is empty. When an empty buffer is found data will be transferred into it when the read circuitry detects the beginning of a blockette. As the data from the tape is being read into the empty buffer, a CRC code is generated based on the incoming data. The computed CRC code is then checked against the stored CRC code to determine if there has been an error in recording. If no error is found the buffer containing the blockette data is marked "valid" and the procedure is then repeated to read the next blockette into another empty buffer. Alternatively, if an error is found, the buffer containing the improper blockette data is marked "invalid" and the procedure repeats to read the next blockette.

The second read routine transfers data from the buffers to the host computer device. In this routine, the buffers are checked in sequence for valid data. If a buffer does not contain valid data the next buffer in the chain is checked. If a buffer does contain valid data, the blockette number which was read into the buffer along with the data is checked to see if it is the next blockette number in the blockette number sequence. If it is, the data in that buffer is transferred to the host computer. If the blockette number is not the next number in sequence, the routine proceeds to the next buffer in the chain and checks for valid data.

Since only blockettes containing good data are transferred to the host computer, no errors result if blockettes containing invalid data have been recorded on the tape. Similarly, if the blockettes are out of sequence on the tape (as would occur if a data error had occurred during the write operation) they are reassembled in the proper sequence before being transferred to the host computer. In addition, once one blockette with the proper sequential blockette number has been found, the read routine then searches the buffer ring for the next sequential blockette number. A blockette which is duplicated is thereby ignored by the routine.

Figure 5:
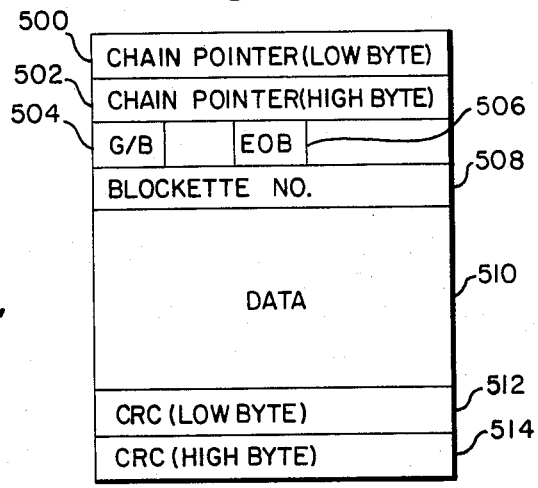
FIG. 5 of the drawing shows the detailed layout of information in each of the internal buffer memories.

FIG. 5 shows the arrangement of control information and data in each of the controller data buffers. In the illustrative embodiment all of the buffers are contained in one internal memory; each buffer is assigned a predetermined area in the memory. The buffers are linked together into a "ring" by means of a "chain pointer". In particular, each of the buffers is one byte wide as shown in FIG. 5. The first two bytes, 500 and 502, contain a 16-bit address that is the beginning address of the next buffer in the chain.

The chain pointers are followed by a flag byte which contains information indicating the status of the buffer. The first bit 504 in the flag byte indicates whether the information contained in the buffer is "valid" in that no CRC error has been detected. Another bit, 506, is used to indicate when the buffer contains the end of the data record (EOR flag). In this situation the buffer may not contain the full 256 bytes of data information and the various processing routines must be informed so that erroneous information is not transferred. The remainder of the flag byte is used for other conditions which are not important for an understanding of the present invention.

The flag byte is followed by byte 508 which contains the blockette number. Following the blockette number byte 508, are a plurality of bytes, 510, (up to 256) of data. The data is, in turn, followed by two bytes, 512 and 514, containing the stored CRC code for the data in the buffer.

Figure 6:
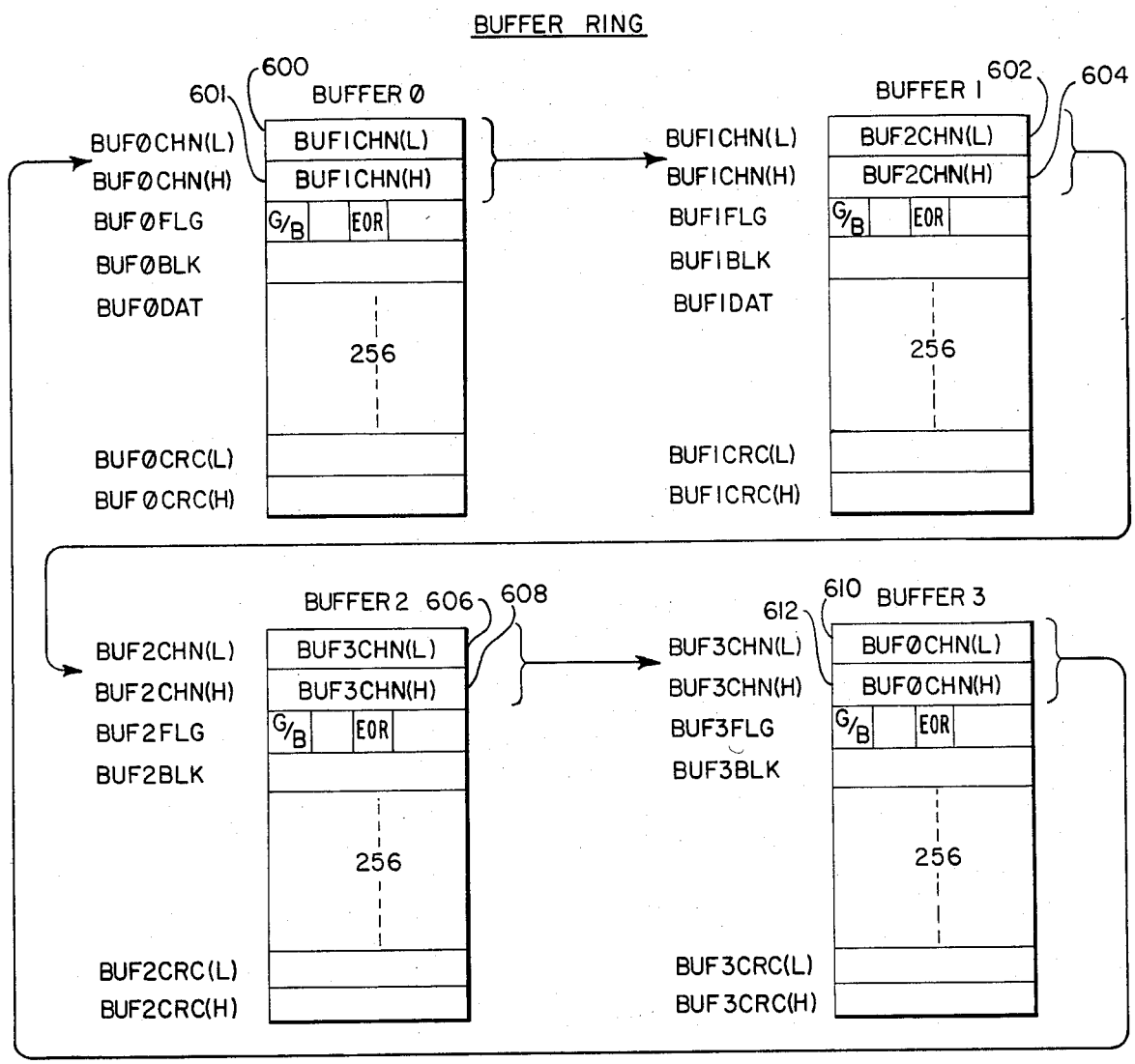
FIG. 6 illustrates how the internal buffer memories are linked together by chained address pointers.

As shown in FIG. 6, in the illustrative embodiment there are four buffers which are connected in a "ring" by means of the buffer chain addresses. In particular, buffer 0 contains a 2-byte buffer chain address consisting of bytes 600 and 601 (the low and high order bytes of the address). These bytes are stored in address locations BUF0CHN(L) and BUF0CHN(H), respectively and together form the address BUF1CHN(L) which is the start of buffer 1 (in particular the address of the first chain pointer in buffer 1). Similarly, the chain pointer consisting of bytes 602 and 604 in buffer 1 points to the starting address of buffer 2 (BUF2CHN(L)).

The chain pointer in buffer 2 (bytes 606 and 608) also points to the beginning of buffer 3 and the chain pointer bytes (610 and 612) in buffer 3 complete the "ring" by pointing to the start of buffer 0 (BUF0CHN(L)). Thus, any procedure which operates on the data in any of the buffers, for example, buffer 0, can proceed to the next blockette of data by merely indexing the address specified by the chain pointer. The chain pointer mechanism allows any search over the buffer ring to be performed quickly to ascertain the address of empty buffers or buffers which contain valid data.

Detailed flow charts of the read and write routines as may be illustratively performed by the central processing unit in a magnetic tape controller as described hereinabove, are shown in FIGS. 7-20.

The read and write routines are controlled by mean of pointer and status registers, which are used to hold routine status information, and an acknowledge counter. One status pointer is designated as CURPBLK and contains the blockette number of the current blockette which is being transferred from the controller buffers to the host computer system. Another pointer is kept in register CUR_PTR. This register contains the address of the buffer which is next in the buffer chain to the buffer which is involved in a data transfer (either into or out of the buffer). Still another status register, CUR_PDMA contains the address of the buffer which is currently being transferred to the host computer system. In addition, a status register, PBLKSEM, is used which contains two status flag bits. One flag bit, when set, indicates that the address of a buffer containing information to be sent to the host computer has been loaded into the mechanism (described below) which effects the transfer. The other status bit, when set, indicates when a blockette is, in fact, being transferred from a buffer to the host computer system. The acknowledge counter is contained in a register labelled ACK_CNT.

Figure 7A:
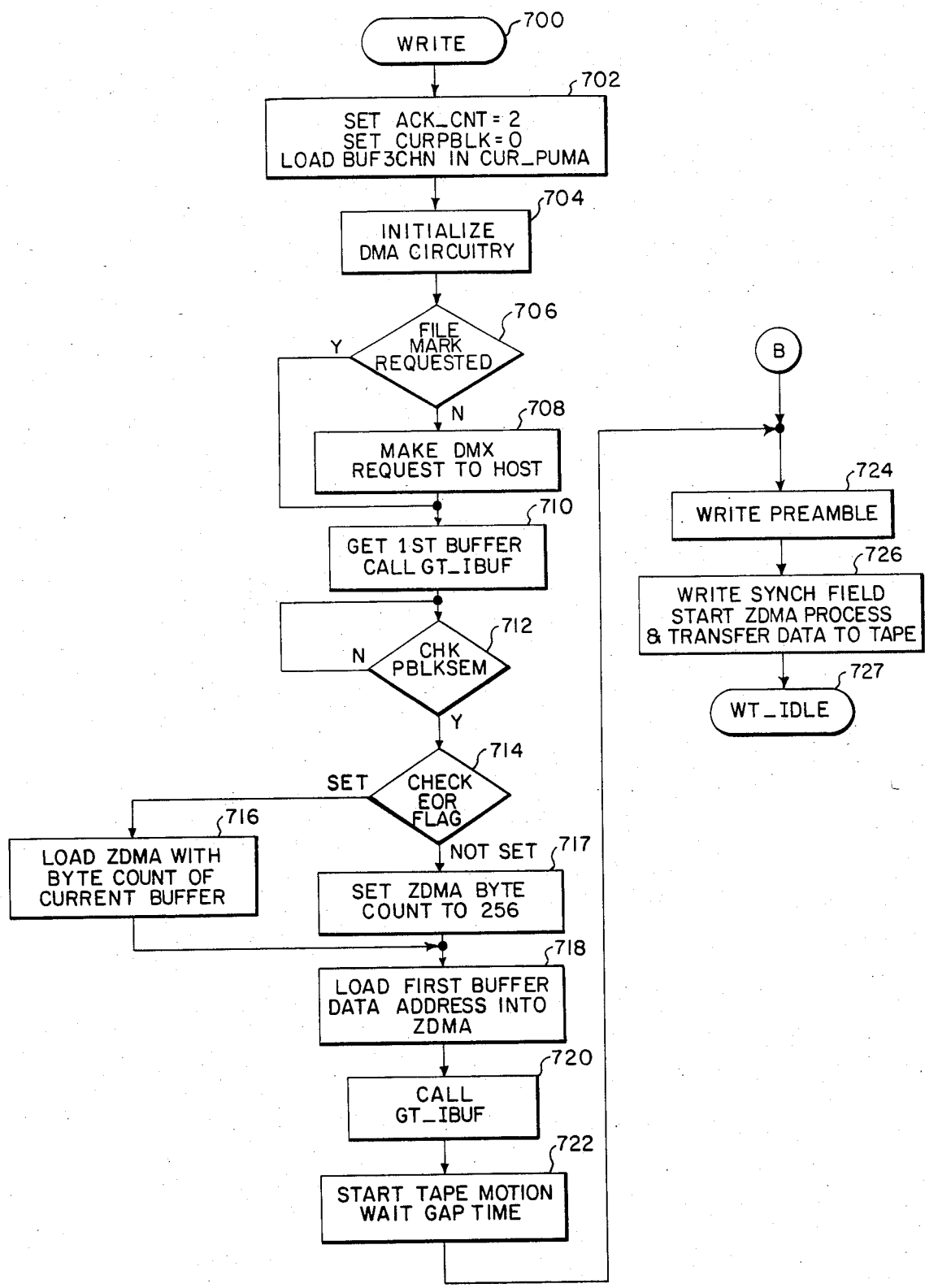
FIGS. 7A-7C are detailed flow charts of the steps performed by the write circuitry in writing blockettes of information on the tape.
Figure 7B:
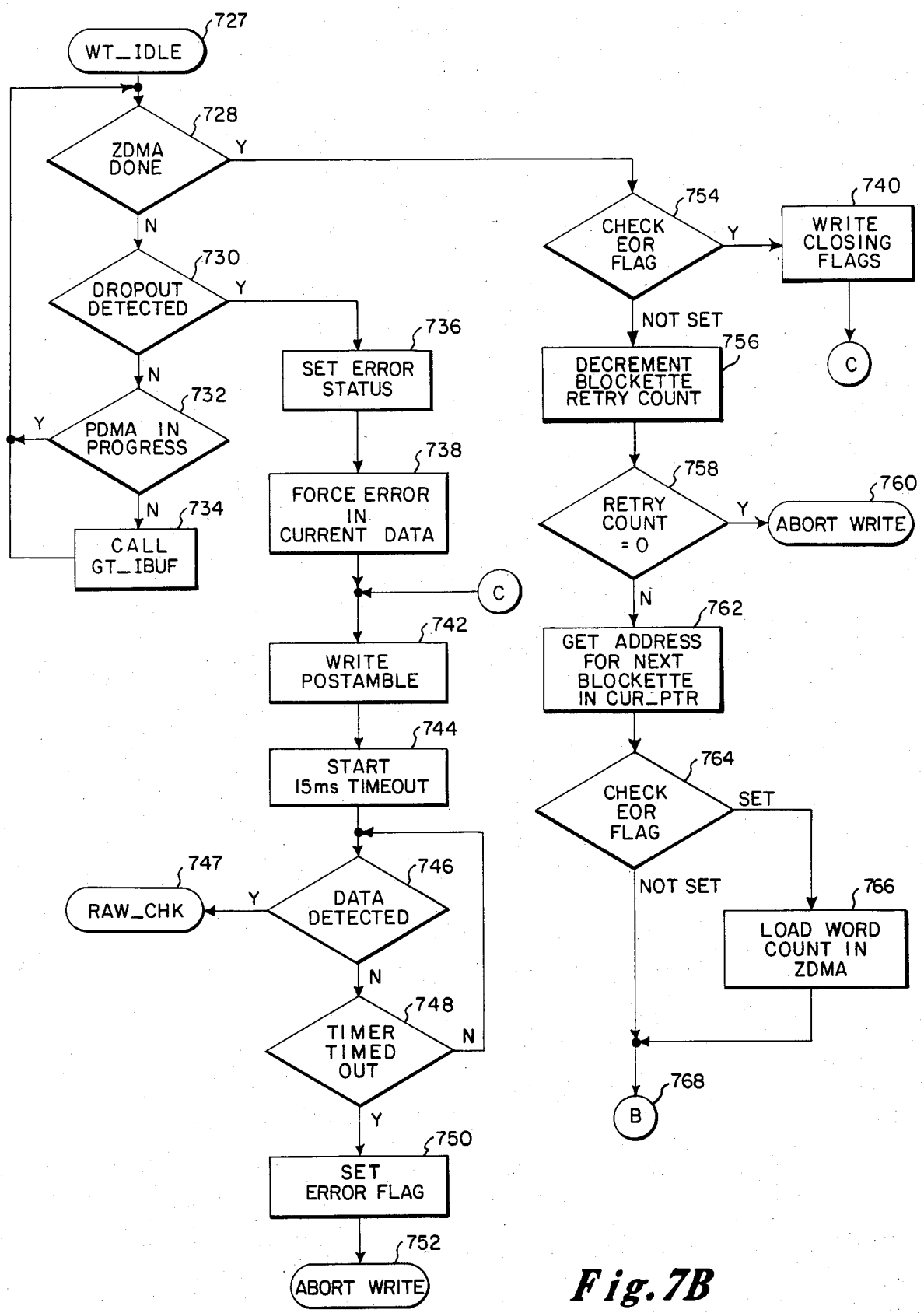
Figure 7C:
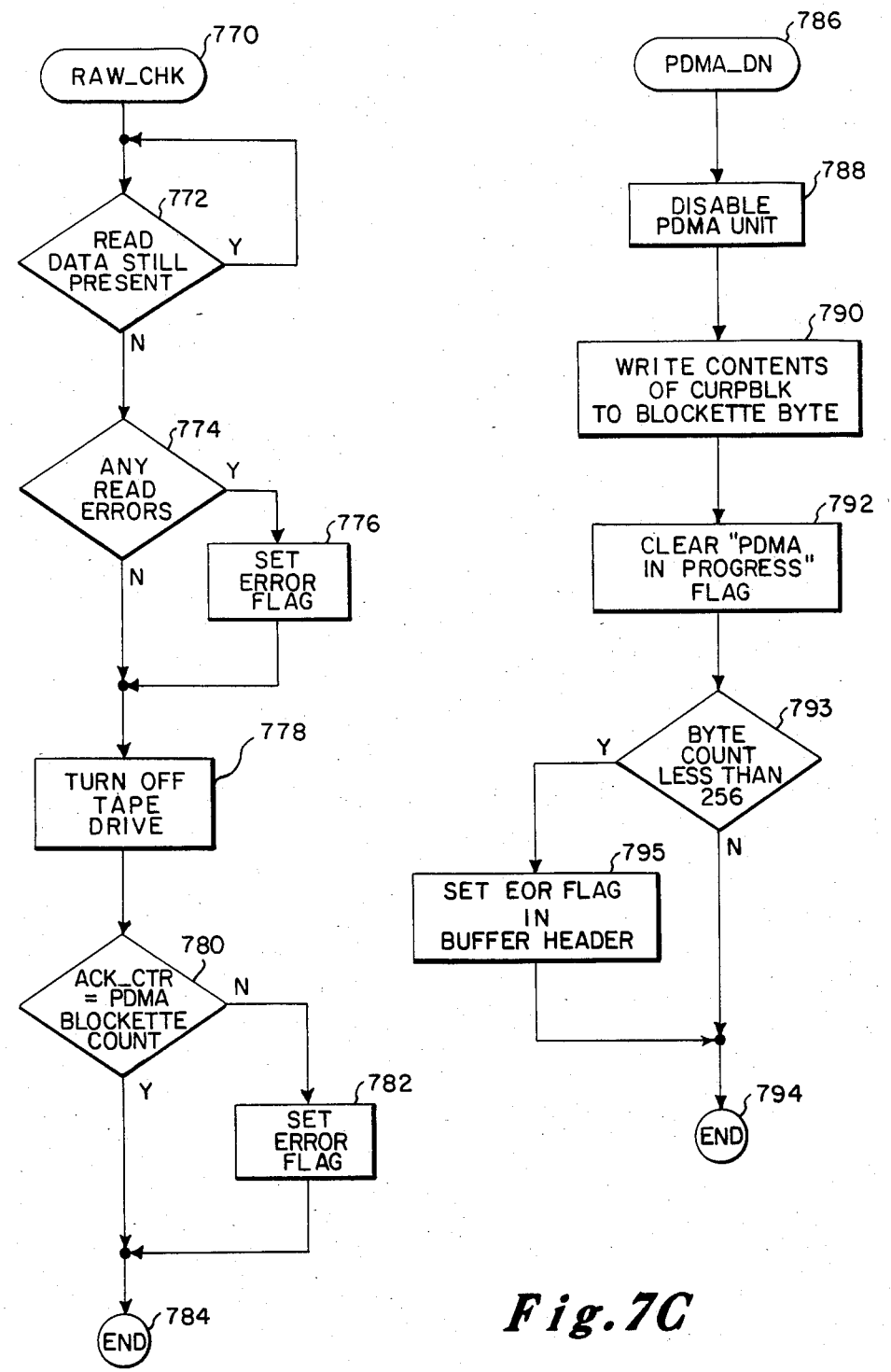

The steps of the main write routine 700 are shown in FIGS. 7A, 7B and 7C. FIG. 7A shows the portion of the routine which sets up the transfer of information from the host computer system to the first two buffers. Some initialization must take place before the main write routine in FIGS. 7B and 7C can be started. The write routine begins with step 702 in which the pointer registers and acknowledge counter are initalized. The acknowledge counter, ACK_CNT, is set to "2" and the blockette number of the current blockette to be output to tape contained in CURPBLK is set to 0 (this number will be incremented later to "1" so that it points to the first blockette number). In addition, the CUR_PDMA register is loaded with the starting address of the first buffer (contained in the chain pointer of buffer 3 at address BUF3CHN(L) and BUF3CHN(H)).

Subsequently, in step 704, the DMA hardware associated with the controller is initialized by setting configuration registers in preparation for beginning a write. As conventional with DMA controllers, to begin a data transfer, the DMA controller hardware is first provided with source and destination addresses and a byte count of words to be transferred. The controllers are enabled to begin the actual transfer. After being started, the DMA controllers automatically transfer information contained in locations sequential to the starting address without intervention by another central processing unit. The transfer of information continues until the specified number of bytes have been transferred at which time the number of bytes transferred (byte count) is stored and an interrupt is generated. The actual transfer operation is called a "process" and, in the illustrative embodiment, the transfer of information from the buffers to the host computer system is called the "PDMA process" and the transfer of information from the buffers to the write circuitry is called the "ZDMA process". The write circuitry also operates independently of the central processing unit and is called the "SIO process".

In step 706, the write routine decides whether a "file mark" is to be written by examining a flag register set by the host computer system. A file mark is a special character indicating the beginning of a data file. If a file mark is not to be written the routine proceeds to step 708 in which a DMX request is made to the host computer to prepare it to send in the data to be recorded on tape. Alternatively, if a file mark is to be written, the file mark code will be generated by the controller itself and no DMA request is made since no data will be transferred from the host.

The write routine then calls a subroutine which is named GT_IBUF. If a file mark is to be created this subroutine (which will be described in detail later) creates the file mark. If data is to be transferred, the GT_IBUF subroutine selects an empty buffer (storing the buffer's address in the CUR_PDMA register) based on the number of the blockette currently being written to the tape (the blockette number is stored in the CURPBLK register) and starts the input of a blockette of data from the host computer system in the selected buffer.

As an additional part of the routine, the CURPBLK register is incremented (to "1") and one of the flags in the PBLKSEM register is set indicating a transfer from the host computer is in progress (a "PDMA in progress" flag).

As mentioned above when the PDMA process is complete, an interrupt is generated by the DMA controller unit. This interrupt causes the central processing unit to start the PDMA_DN routine shown in FIG. 7C. This routine in step 788 first disables the DMA unit to prevent further transfers and then, in step 790 writes the contents of the CURPBLK register (containing the next blockette number into the blockette byte of the buffer that has just been filled. Next, in step 792 the "PDMA in Progress" flag is cleared. The routine then ends in step 794.

Meanwhile, the write routine (FIG. 7A) in step 712, monitors the "PDMA in Progress" flag in the PBLKSEM register to ascertain when the PDMA transfer has been completed. When this occurs, the routine moves to step 714 in which it examines the end of record flag (set by the PDMA_DN routine) in the buffer to ascertain whether this initial block is the last block that will be transferred. If this block is the last block, the routine proceeds to step 716 in which it sets the byte count of the ZDMA unit for a later transfer of the information to the write circuitry to a byte count obtained from the read-after-write routine. If the initial blockette is not the last, in step 717 the ZDMA byte count is set to 256.

The write routine then proceeds to step 718 in which the address of the data in the first buffer is sent to the ZDMA unit. The routine proceeds to step 720 in which the GT_IBUF subroutine is called again to obtain a second empty buffer and start the transfer of a second blockette of information from the host computer to the second buffer. The GT_IBUF subroutine also checks the end of record flag in the previous buffer so that it immediately returns if the first buffer contains the only record which is to be transferred.

In step 722 the routine next controls the tape drive to start the tape in motion. In order to allow the tape to reach recording speed the routine waits for an appropriate time interval and then proceeds to step 724. In this step the preamble information (described previously) is written onto the tape. Subsequently, in step 726, the synchronizing field information is written, then the ZDMA unit is started in order to transfer the data in the first blockette onto the tape and a "ZDMA in Progress" flag is set. At this point, writing proceeds under control of the ZDMA unit until the number of bytes in the ZDMA byte count have been transferred at which point an interrupt is generated. The interrupt causes the central processing unit to perform a routine which clears the "ZDMA in Progress" flag. The write routine then proceeds to the main write routine WT_IDLE shown in FIGS. 7B and 7C.

As shown in FIG. 7B, the "ZDMA in Progress" flag is monitored in step 728. If the ZDMA flag has not been cleared, the routine proceeds to step 730 to monitor for data dropouts. It does this by examining a status register. If a data dropout is detected, the routine proceeds to step 736 in which error status flags are set and to step 738 in which an error is forced in the current data. This can be done in many different ways. One way is to write a sequence of seven or more ones. This sequence is impossible in normal bit stuffed data (as previously) described and therefore will cause an error when the data is read. Alternatively, the CRC code can be forced to an error condition. The routine then proceeds to write the postamble information on the tape as described below.

Alternatively, if no data dropout is detected, the routine proceeds to step 732 and checks the "PDMA in Progress" flag in the PBLKSEM register to determine if transfer of data from the host computer system to the internal buffer memories is still in process. If the PDMA process is finished, the GT_IBUF subroutine is recalled in step 734 to start transfer of a new blockette of data from the host computer to a new buffer. If the PDMA process is not finished, the routine returns to step 728 and again checks to see if the ZDMA transfer is still in process. When the ZDMA is no longer in process, indicating that the entire blockette has been written, the routine proceeds to step 754 and checks the end of record flag in the buffer just written on tape to see if the blockette just written to tape was the last blockette which will be written.

If it was, the routine proceeds to step 740 and writes the closing flags for the blockette. Then the routine proceeds to step 742 and writes the postamble and starts the read-after-write time-out in step 744. As previously described, after data is written it is read after the short interval of time that the tape takes to pass between the read and the write heads. At normal tape speed, the tape passes from the write head to the read head in less than fifteen milliseconds. Therefore, if no data has been detected by the read circuitry within fifteen milliseconds after the postamble has been written, then an error is declared.

In particular, after starting fifteen millisecond timeout in step 744, the routine checks for the detection of data in step 746. If no data has been detected then the timer is checked in step 748. The routine continues checking data and timer until either the data is detected, in which case the routine proceeds to the read-after-write routine 747 (RAW_CHK) shown in FIG. 7C. Alternatively, if the timer times-out before data has been detected an error flag is set in step 750 and the write routine is aborted in step 752.

If, in step 754, the blockette written to tape was not the last blockette to be written, the end of record flag will not be set in the associated buffer. In that case, a retry counter is decremented in step 756. This counter controls the number of retries that will be made to write the same data on the tape and is initially set to a value of "ten" (by the read-after-write routine RAW_INT shown in FIG. 8, step 807). If data cannot be properly written on the tape in ten retries, a gross media error or some other type of malfunction is indicated, and the write process will be aborted.

Therefore, in step 758, the retry counter is checked to see if it has been decremented to "0", if it has been, the write process is aborted in step 760. If there have been less than ten retries, the main write routine proceeds to get the buffer address of the next blockette to be written to the tape from the CUR_PTR register in step 762. As will be hereinafter explained, the next buffer address in the CUR_PTR register is determined after the previous blockette has been read by the read-after-write routine (RAW_INT). This buffer corresponding to this address may contain the next sequential blockette information if the previous blockette was recorded properly, or, in accordance with an aspect of the invention, it may contain information from the previous blockette if it was recorded improperly.

In step 764, the routine checks the end of record flag in the new buffer obtained in step 762 to see if it is the last buffer. If so, the byte count of the data in the buffer (obtained from the read-after write circuitry) is loaded into the ZDMA unit. If not, the routine proceeds via step 768 to the write preamble step 724 in FIG. 7A. The routine then proceeds through the various loops described above to write the next blockette of data. Operation continues in this manner until either an error is detected or the entire record is written and the RAW_CHK routine shown in FIG. 7C is entered.

The RAW_CHK routine starts at step 770 and proceeds to step 772 which checks the status of the writing circuitry to see whether there is any remaining data which is in the process of being read from the tape. If there is, the routine waits and continues to check until all the data has been read from the tape. It then proceeds to step 774 to check to see if there are any read errors. Read errors are determined internally by the read circuitry which compares CRC codes as described above and sets a status flag if an error is detected. If there are errors, error flags are set in step 776. If not, the tape drive is turned off in step 778 so that the tape begins to slow down. Then, in step 780, the read-after-write routine checks to determine the number of blockettes read back by the read circuitry (read-after-write blockette number) were equal to the number written (PDMA write blockette count). If not, an error flag is set in step 782. If so, the read-after-write routine is completed in step 784.

Figure 8:
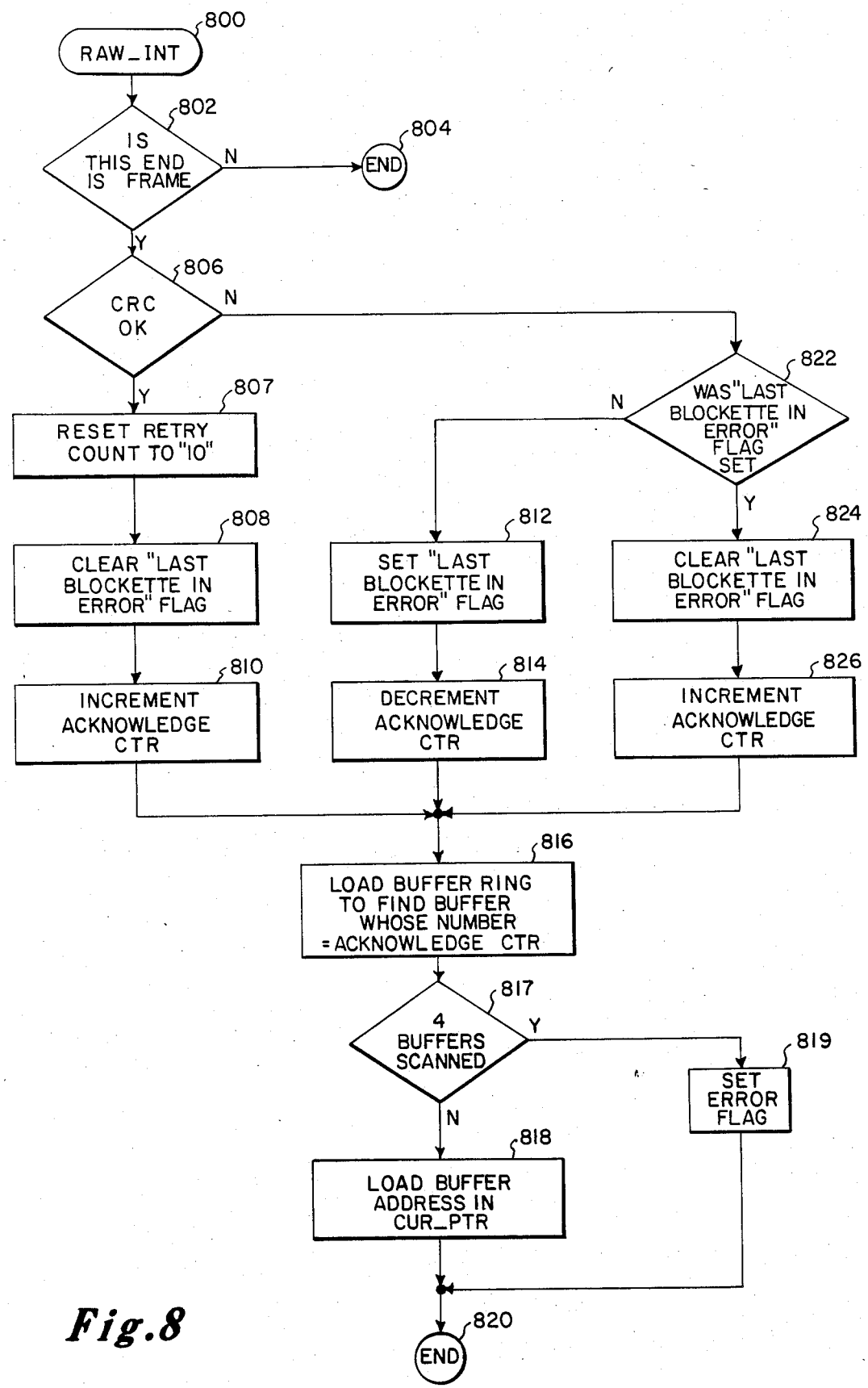
FIG. 8 is a detailed flow chart of the steps performed by the read-after-write circuitry in determining whether a blockette has been recorded properly and controlling the acknowledge counter.

The steps performed by the error correcting routine 800 (RAW_INT) are shown in FIG. 8. This routine is initiated by an interrupt generated by the SIO process when an entire data blockette has been read. It handles the checking of the read after write data and also generates a pointer in register CUR_PTR to the next buffer to be written according to the error correction method described above.

The RAW_INT routine starts with step 802 in which the SIO process is monitored to determine when the end of a blockette has occurred. If an end of frame has not been reached the routine ends in step 804. If an end of frame has been detected in 806, the CRC status of the buffer just read is checked to determine if the CRC code indicates that an error has been detected. In the illustrative embodiment the CRC code is generated and checked by the SIO circuitry described hereinabove.

If the data has been properly read the routine proceeds to step 808 in which a "last blockette in error" flag is cleared and to step 810 to increment the acknowledge counter. On the other hand, if the CRC check indicates that the data information has been improperly recorded, the routine proceeds to step 822 to calculate the blockette number of the next blockette which will be written.

In step 882 the "last blockette in error" flag is examined to see whether the last blockette that was written was also improperly recorded. If it was, multiple sequential blockettes are in error and the "last blockette in error" flag is cleared in step 824 and the acknowledge counter is incremented in step 826. If the last blockette is not in error, the "last blockette in error flag" is set in step 812 and the acknowledge counter is decremented in step 814.

Next, the routine scans the buffer ring to find a buffer whose stored blockette number matches the acknowledge counter value determined in steps 812, 814 or 822-826. The buffer scan continues for four buffers (the entire ring). If all four buffers have been scanned in step 817 without finding the matching blockette number, an error condition is indicated and error flags are set in step 819. If a buffer with a matching blockette number is found in four or less scans, the pointer to it is loaded into the CUR_PTR register for use by the write loop in step 818 and the RAW_INT routine is terminated in step 820.

Figure 9:
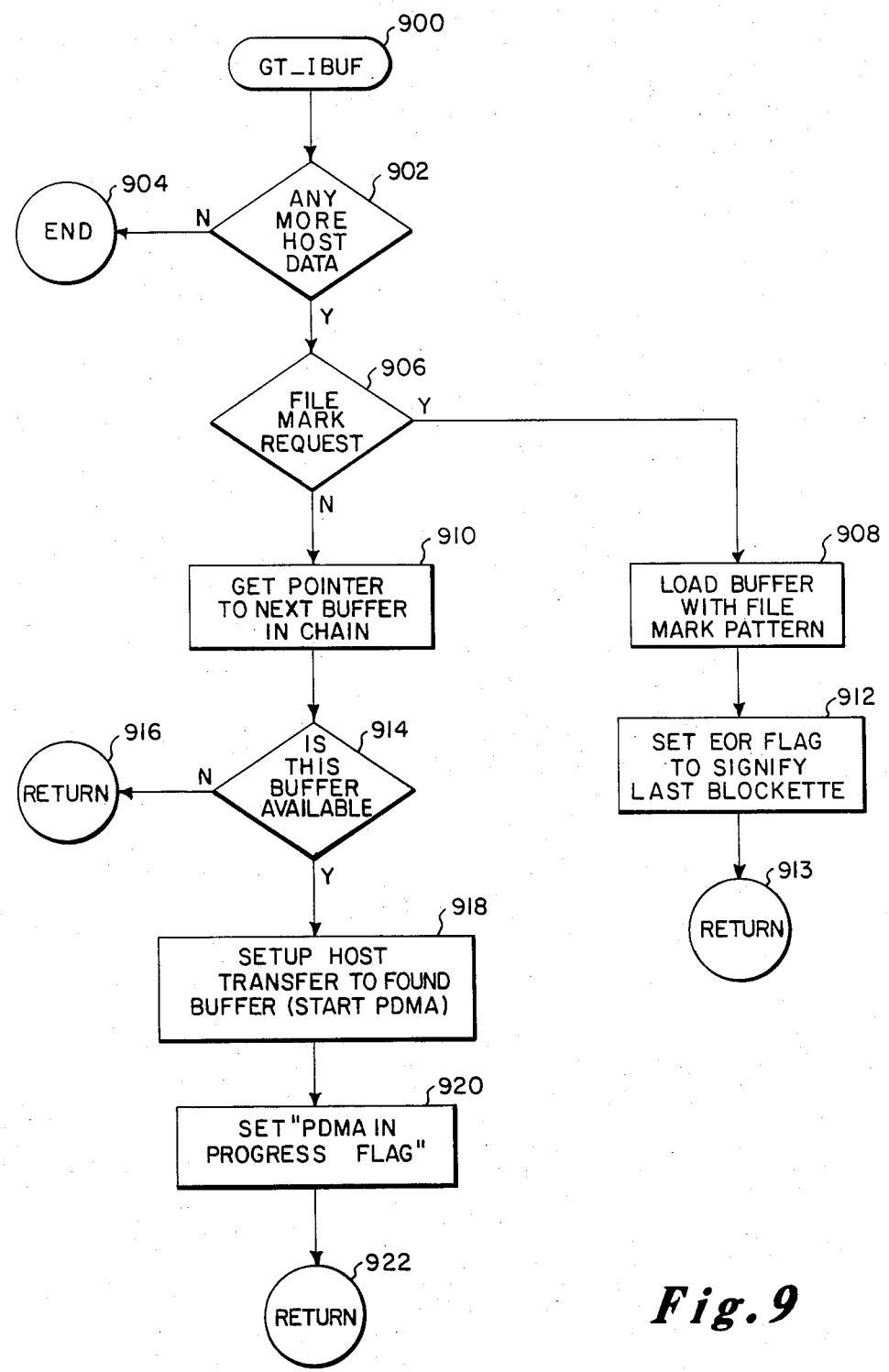
FIG. 9 is a detailed flow chart of the steps performed by a subroutine which selects an empty buffer from the buffer chain for transferring data from the host computer system to the tape controller.

FIG. 9 shows the steps in the GT_IBUF subroutine 900 which identifies the next available buffer in the buffer chain and starts the transfer of data from the host computer system to the empty buffer. The GT_IBUF subroutine starts with step 902 in which the subroutine checks for a flag generated by the host computer system indicating that there is no more data to be transferred. If there is not, the subroutine ends with step 904. If more data remains to be sent, in step 906, the subroutine checks a status register to determine if the computer is requesting a file mark.

In the illustrative embodiment, a file mark consists of a blockette in which all data spaces and the blockette number are set to 0B (hexidecimal code). If a file mark is to be written, the subroutine proceeds to step 908 in which a dummy buffer is created and then loaded with file mark codes (0B, hex) and the end of record flag is set in the buffer flag byte (step 912). The subroutine then returns, in step 913, to the calling routine.

If there is not a file mark request, in step 910, the subroutine gets the address to the next buffer in the chain from the chain pointer in the current buffer. Then, in step 914, the subroutine checks to determine if this buffer is available for receiving new information. Availability is determined by examining the blockette number stored in the buffer and comparing it to the acknowledge counter. If the blockette number is at least two less than the value contained in the acknowledge count register ACK_CNT then the blockette is deemed available. If the blockette number is not two less than the acknowledge count, the blockette is deemed not available and the routine proceeds to return in step 916. However, since the "PDMA in progress" flag is not set the calling routine will continue to call the GT_IBUF subroutine until an available buffer is found.

On the other hand, if the next buffer in the chain is available, in step 919, the subroutine loads the starting address of the found buffer into the PDMA unit and enables the PDMA unit which thereupon transfers information from the host computer system to the selected buffer.

In step 920, the "PDMA in Progress" flag is set to indicate that a transfer is taking place. In step 922, the subroutine then returns.

READ ROUTINES

Figure 10:
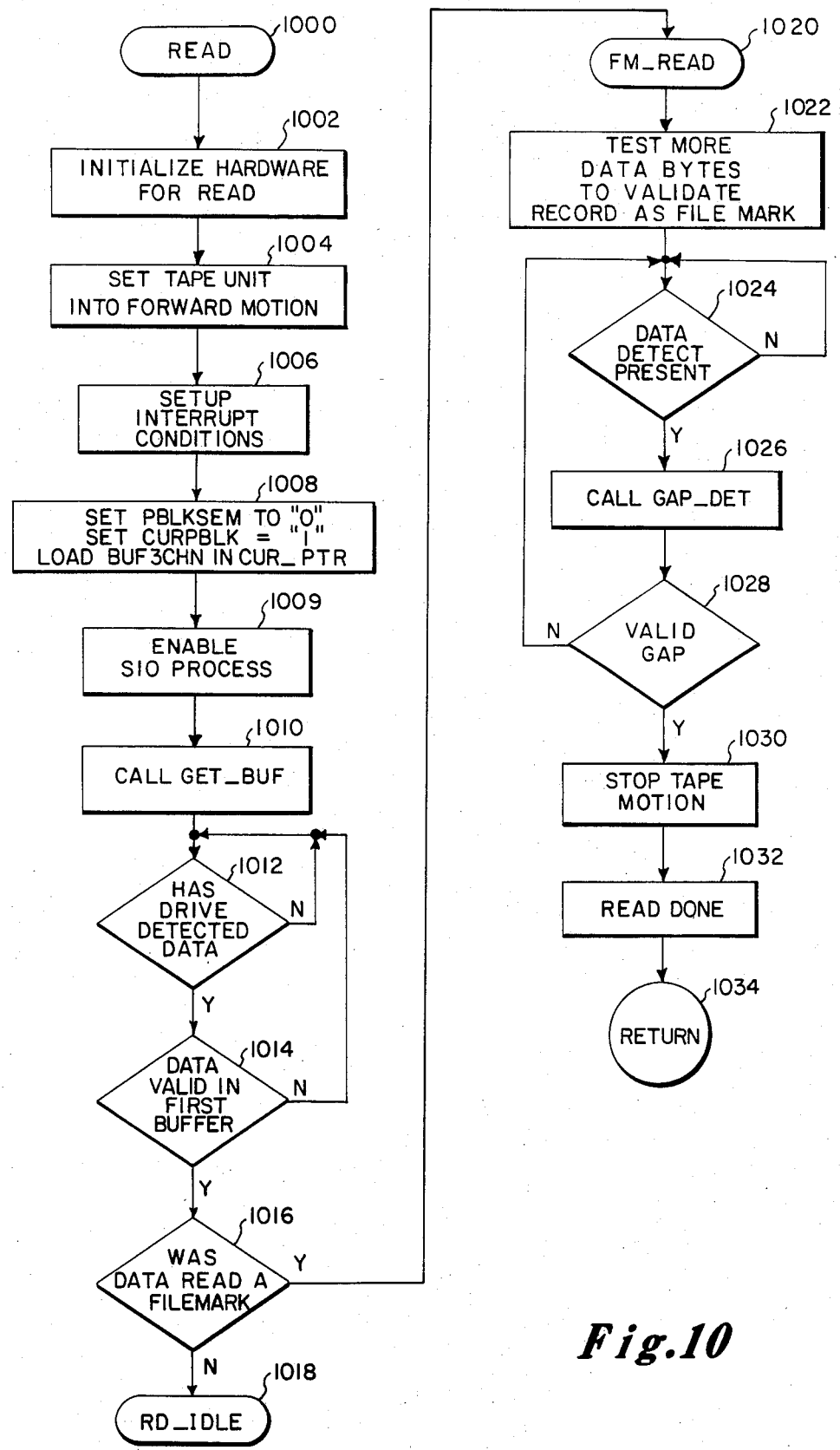
FIG. 10 is a detailed flow chart of the steps performed by the read circuitry in reading data from the tape and transferring the data to the host computer system.

The routines which read a record from tape and transfer it to the host computer system are shown in FIGS. 10–20. The initializing and set up routine is shown in FIG. 10. This routine places the tape controller in a condition to read a record from the tape and read the first blockette of information into a buffer.

As with the write routine, the read routines are controlled by several pointer registers. These registers are the CUR_PTR register which, as within the write routine, contains the address of the next buffer to be read and the CURPBLK register which contains the block number of the current blockette which is being transferred to the host.

The initial read routine starts with an initialization step 1002 in which the controller hardware is initialized with the proper configuration to carry out the read operation.

In step 1004 the tape drive is set in motion to begin the read operation. In step 1006 interrupt conditions to be detected by the central processing unit are set up in a conventional fashion.

In step 1008, the PBLKSEM register is cleared to indicate that the PDMA process is neither loaded nor running. A "1" is loaded to the CURPBLK register to indicate that the current blockette which is to be output to the host computer system is blockette number "1". In addition, the address found in the chain pointer of buffer number 3 (this points to buffer number 0) is loaded into the CUR_PTR register so that the first buffer to be checked for availabililty is buffer 0.

In step 1009, the read routine enables the SIO process to begin looking for data on the tape. The read routine then calls the GET_BUF subroutine in step 1010. This subroutine, as will be hereinafter described, checks the buffer ring starting with buffer 0 (the buffer address loaded in the CUR PTR register) to detect an available buffer in which the ZDMA process will load data read from the tape. It returns to the read routine with the next available buffer's address loaded in the CUR_PTR register.

When data is found the SIO process generates an interrupt which will cause the central processing unit to start the ZDMA process to transfer the information into an available buffer.

In step 1012, the read routine monitors the status of the SIO process to determine whether the tape drive has detected any data. If not, it continues monitoring the SIO process until data is detected. After data has been detected, the SIO process begins moving a blockette of data from the tape to the buffer specified by the address in the CUR_PTR register. When the blockette read operation has been completed, the SIO process will generate an interrupt which, in turn, will cause the central processing unit to start the READ_DN routine. This routine, which will be described in detail later, checks to determine whether the data has been properly read and, if so, will set the buffer valid flag in the flag byte of the buffer containing the data.

The buffer valid flag is checked by the read routine in step 1014 to determine whether the data is valid in the first buffer. If it is not, the routine continues to wait for additional data to be read in. If the data is valid, in step 1016, the read routine checks to see whether the data was a file mark by reading the blockette number (a blockette number of "0B" hex is a file mark in this embodiment). If the record is a file mark, file mark processing 1020 is invoked and in step 1022 additional data is checked to validate whether the record is indeed a file mark.

File mark processing then proceeds to step 1024 in which it monitors the SIO process to ensure that data is in fact being detected. This process continues until the interrecord gap at the end of the record is reached. At this point, a gap detection routine called GAP_DET (to be described later) is called in step 1026 which verifies in fact that a valid interrecord gap has been reached rather than a crease or other imperfection. If a valid gap has been reached as shown in step 1028, a complete record, in the form of a file mark, has been read in and therefore the tape motion is stopped in step 1030, a flag is set in step 1032 to indicate that the read operation has been completed and the routine returns in step 1034. On the other hand, if a valid gap has not been detected the routine returns to step 1024 to monitor the data until a gap has been detected. If, in fact, the data read in was not a file mark, the read routine proceeds to the main read routine RD_IDLE in step 1018.

Figure 11:
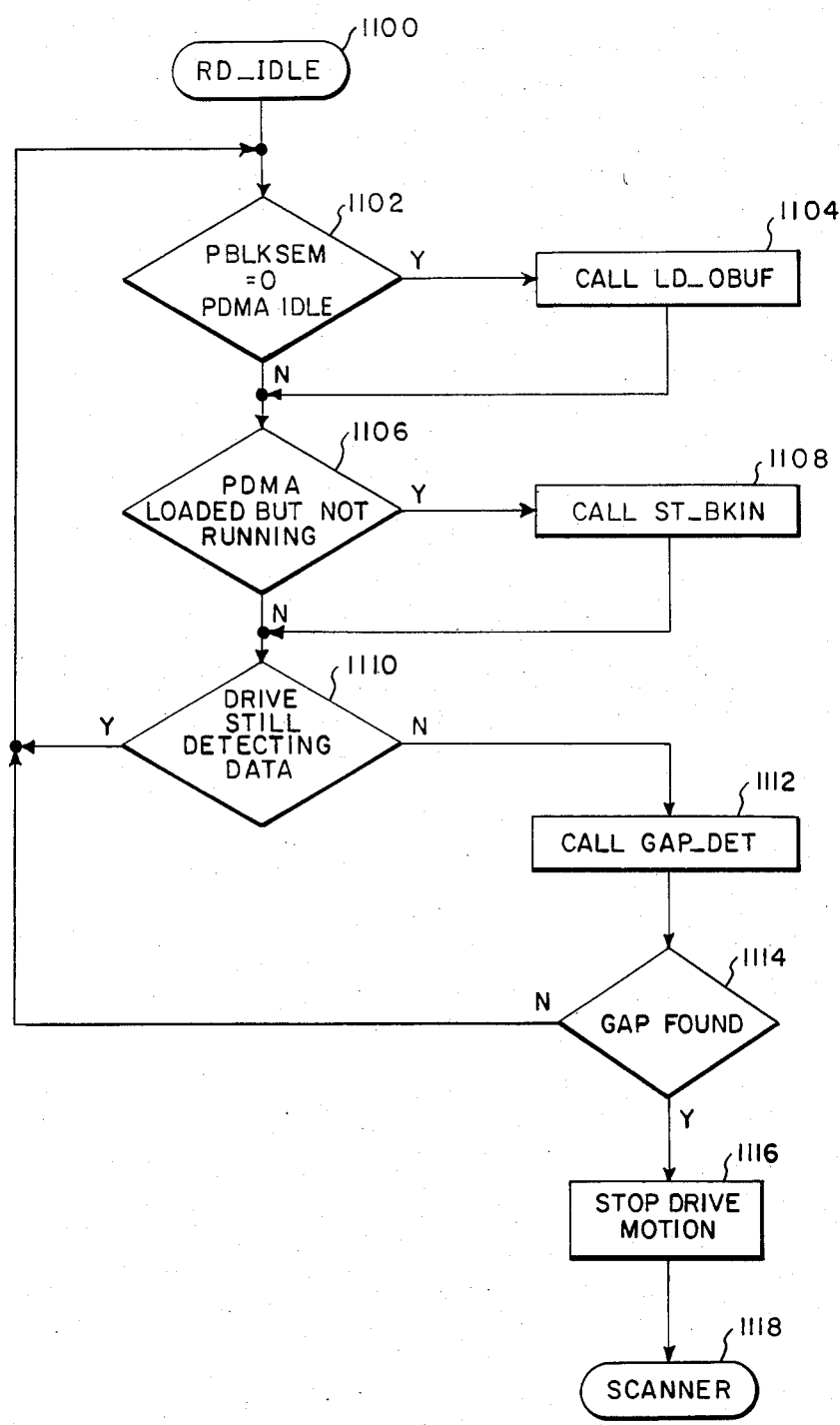
FIG. 11 is a detailed flow chart of additional steps performed by the read circuitry in reading data from the tape and transfering the data to the host computer system.

The RD_IDLE routine is shown in FIG. 11. This routine transfers data from the internal buffers to the host computer. The RD_IDLE routine repeatedly calls two subroutines LD_OBUF and ST_BKIN. The LD_OBUF subroutine finds the next sequential buffer full of blockette information to send to the host computer system and loads the buffer's address into the PDMA circuitry which will later transfer the information to the host computer system. The other subroutine, the ST_BKIN subroutine, enables sending of the contents of the buffer determined by the LD_OBUF subroutine to the host computer system by the PDMA.

While the RD_IDLE routine is transferring data from the buffers to the host computer system, the reading of data from the tape into the buffers is under control of interrupts. Several different interrupts can occur during the operation of the RD_IDLE routine. These interrupts include an interrupt to invoke the READ_DN routine which indicates that a complete blockette has been read into a buffer. Another possible interrupt invokes the PDMA_DN routine which indicates that a complete blockette of information has been transferred out of a buffer to the host computer system.

The RD_IDLE routine 1100 starts with step 1102 in which the PBLKSEM status register is checked to find out whether the PDMA process is idle (not loaded and not running as indicated by zeroes in the PBLKSEM register). If it is, in step 1104 the LD_OBUF routine is called to find the next buffer which has information to be transferred to the host computer system. As will be hereinafter explained in detail the LD_OBUF routine loads the buffer address into the PDMA unit which will later perform the transfer and updates the PBLKSEM register to indicate that the PDMA has been loaded, but is not yet running. The RD_IDLE routine then checks the PBLKSEM register to verify this condition. If the PDMA is loaded but not running, the routine calls the ST_BKIN subroutine in step 1108 which starts the PDMA process running to send the buffer information to the host computer system.

If the PDMA process is loaded and running the RD_IDLE routine checks to see if the tape drive is still detecting data in step 1110 by monitoring the SIO process. If not, this indicates that the end of a record has been reached and the routine in step 1112 calls the GAP_DET subroutine to determine whether the gap is an interrecord gap or some other condition which would cause a data interrupt, for example, a tape crease. If, as indicated in step 1114, a "real" gap is found, the tape drive motion is stopped in step 1116 and a scanning routine (to be described in more detail later) in step 1118 is called. This scanning routine ensures that all data buffers loaded by the reading routine are in fact transferred to the host computer system. Alternatively, if no gap is found in step 1114 the routine returns to check to see whether any further information is to be forwarded to the host computer system.

Figure 12:
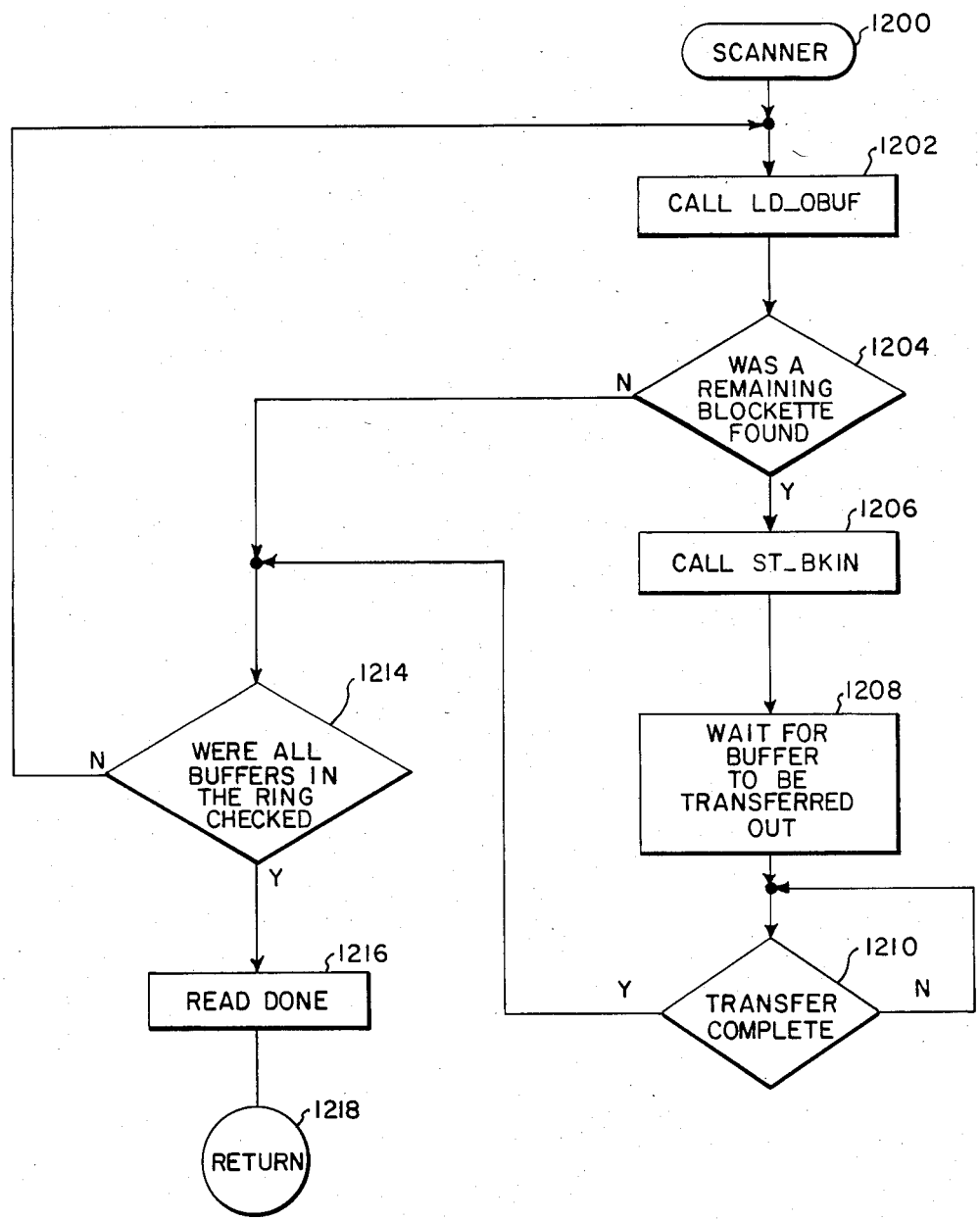
FIG. 12 is a detailed flow chart of the steps performed by a subroutine which, after data has been read into the internal buffer memories, determines if any data remains to be sent to the host computer system.

The steps in the SCANNER subroutine 1200 which is invoked after all blockettes in a record have been read is shown in FIG. 12. In particular, subroutine 1200 starts with step 1202 in which it calls the LD_OBUF subroutine to find the next buffer containing information to be transferred to the host computer system. The SCANNER subroutine then checks, in step 1204, to determine whether a remaining blockette was in fact found by the LD_OBUF routine. If it was not, the routine checks in step 1214 to see if all buffers in the ring were checked. If so, a read done flag is set in step 1216 and the routine returns in step 1218. If all buffers in the ring were not checked, the LD_OBUF routine is again called in step 102 until all buffers have been checked.

If, in step 1204, a remaining blockette is found, in step 1206 the ST_BKIN routine is called to enable transfer of information in the buffer to the host computer system. In step 1208, the SCANNER subroutine then waits for the buffer information to be transferred out to the host computer system and in step 1210 it checks to see whether the transfer has been completed. If not, it waits until it has been completed. Once the transfer is completed the subroutine then returns to step 1214 to make sure all buffers in the ring have been checked.

Figure 13:
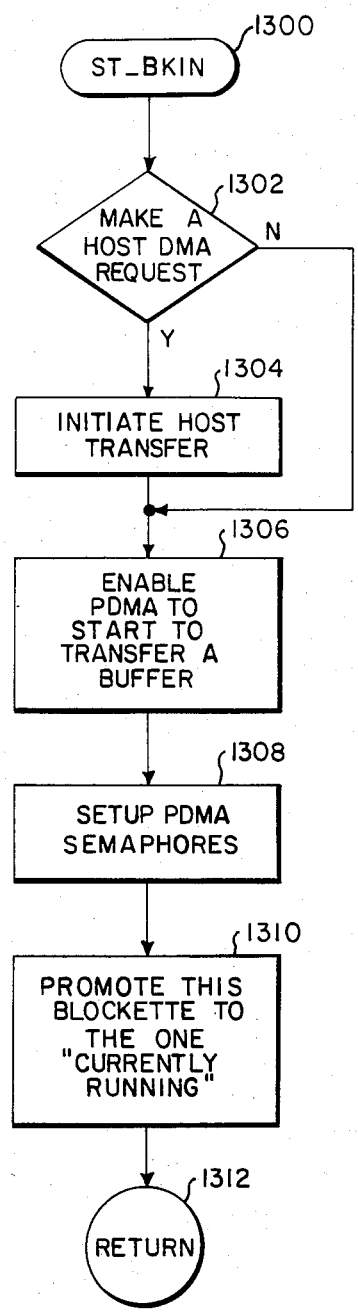
FIG. 13 is a detailed flow chart of the steps performed by a subroutine which transfers a blockette of data to the host computer system.

The ST_BKIN subroutine is shown in detail in FIG. 13. This subroutine starts the PDMA process to transfer a blockette of information from a buffer to the host computer system. In particular, ST_BKIN routine 1300 starts with step 1302 in which it checks to make sure that a host DMA request is necessary. In some cases, a transfer of information to the host might not be desirable, for example, a spacing operation. If a host DMA request is necesary then in step 1304 a request is made to the host computer to enable transfer of information to the host.

In step 1306, the PDMA is started to begin transfer of the information in a buffer to the host computer system. In step 1308, the PBLKSEM status register is updated to indicate that the PDMA process is not loaded but is running. In step 1310, the blockette number stored in the buffer which is currently being transferred is loaded into a register to indicating that it is the current blockette number. In step 1312, the ST_BKIN subroutine returns to the calling routine.

Figure 14:
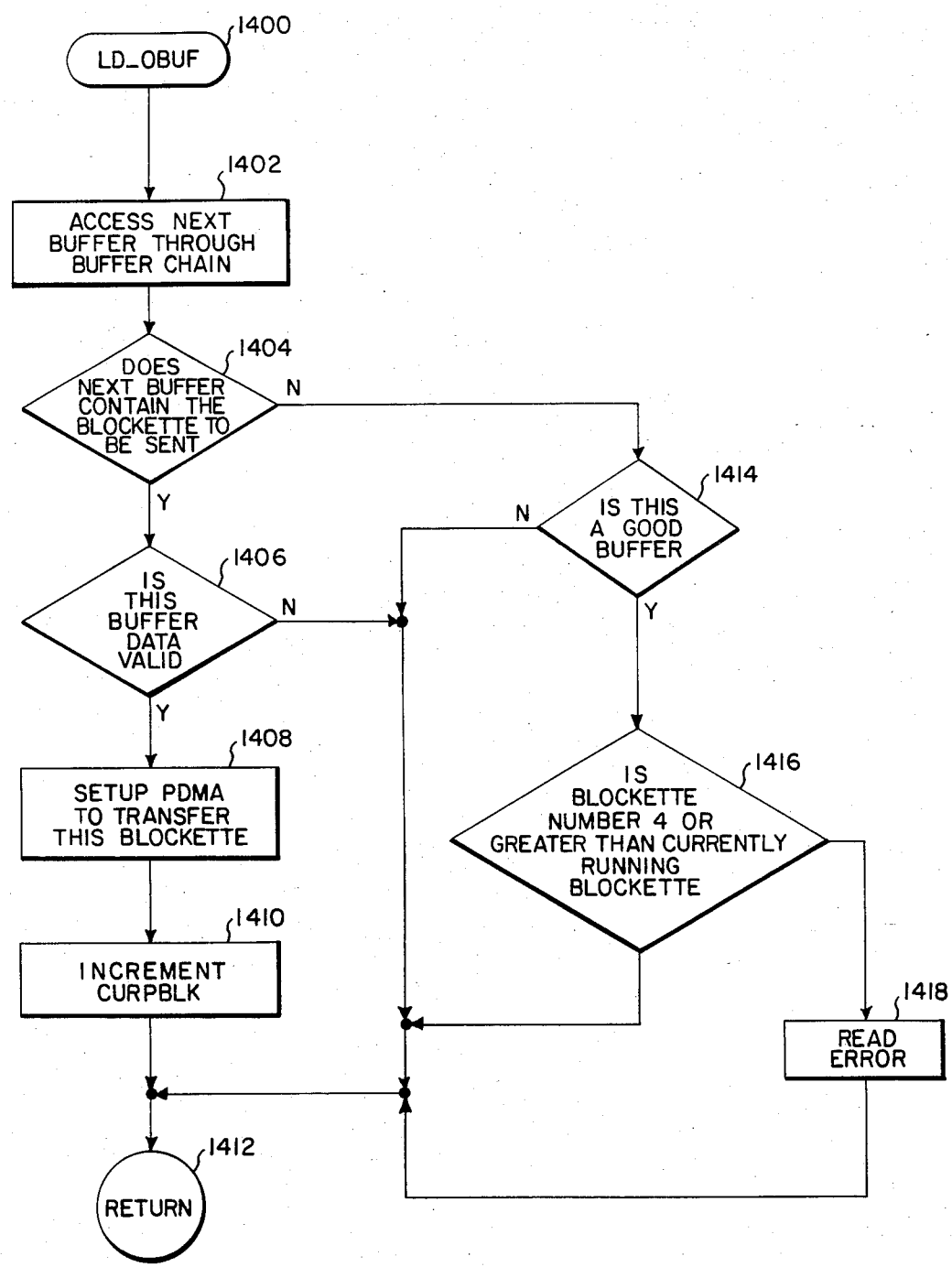
FIG. 14 is a detailed flow chart of the steps performed by a subroutine which selects the sequential order in which blockettes of information are sent to the host computer system.

The LD_OBUF subroutine which finds the next buffer full of information ready to be transferred to the host computer system is shown in FIG. 14. As previously described, this routine selects a blockette that contains valid data and is the next sequential blockette to be sent to the host computer system as indicated by the stored blockette number.

The LD_OBUF subroutine starts with step 1402 in which the address of the next buffer in the buffer chain is obtained from the buffer chain pointer of the buffer which is presently being transferred to the host computer.

In step 1404, the blockette number stored in the next buffer selected in step 1402 is compared against the present blockette number (contained in the CURPBLK register) to determine whether the buffer contains the information of the next sequential blockette which is to be transferred to the host computer system. If it does, the buffer flag byte is examined to determine whether the data stored in the buffer is valid or not. If the data is valid, in step 1408, the subroutine sends the buffers address to the PDMA unit. In step 1410 the CURPBLK register is incremented to provide a new blockette number and the subroutine returns in step 1412.

If, at step 1404, the blockette information in the buffer is not the next blockette information to be sent the host computer, the subroutine checks for "lost" blockettes. In particular, the subroutine first examines the valid data flag in the buffer flag byte and proceeds only if the buffer contains valid data in step 1414. If the buffer contains invalid data, the subroutine returns in step 1412. If the buffer contains valid data, the subroutine checks to see whether the blockette has a blockette number which is four greater than the currently running blockette. If this condition occurs there has been a read error. Appropriate read error flags are generated in step 1418. If not, then the subroutine returns in step 1412.

According to another aspect of the invention, since each access to the LD_OBUF subroutine causes the buffer with the next sequential blockette number to be loaded into the PDMA process, the LD_OBUF subroutine will step sequentially through the buffer chain to transfer valid blockette information in sequential blockette number order. Therefore, no matter what order the blockettes were written in, the data will be reassembled into proper order by the read routine.

Figure 15:
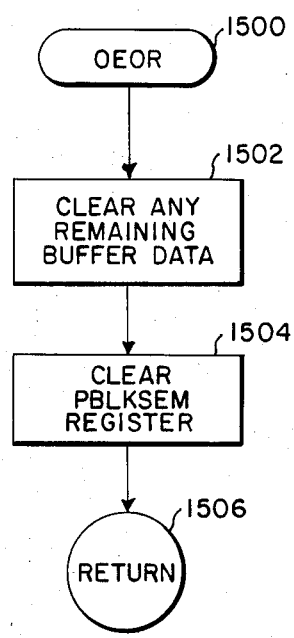
FIG. 15 is a detailed flow chart of the steps performed by a subroutine which clears the internal data buffers after data has been transferred to the host computer system.

FIG. 15 shows a detailed description of the subroutine OEOR. This subroutine clears the buffers after a PDMA transfer to the host computer system. In particular, subroutine OEOR 1500 starts at step 1502 in which any remaining buffer data in the internal buffer memory is cleared. In step 1504, the PBLKSEM status register is cleared to indicate that there are no blockettes loaded and no blockettes running. The subroutine then returns in step 1506.

Figure 16:
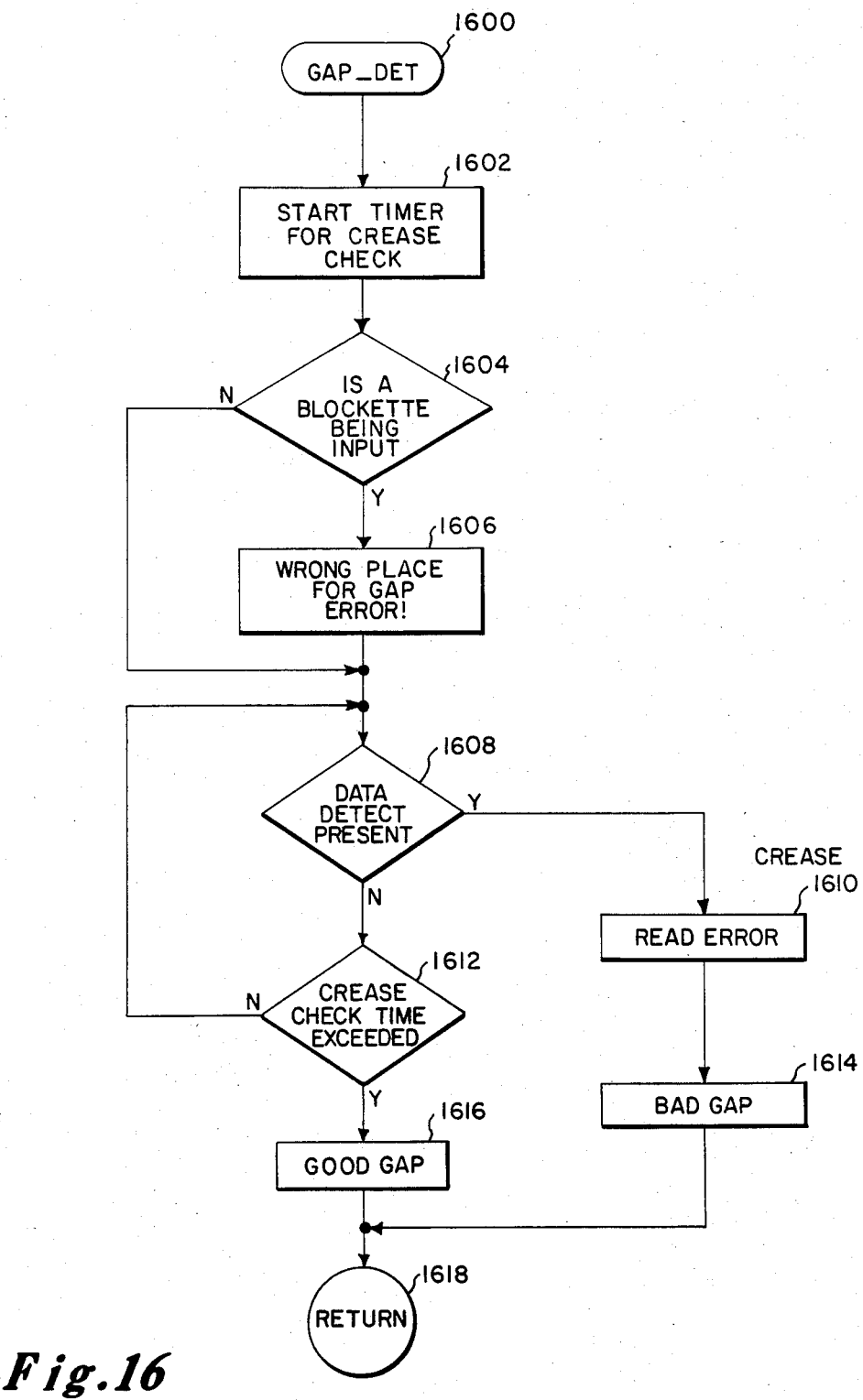
FIG. 16 is a detailed flow chart of the steps performed by a subroutine which detects a gap in the data indicating the end of a data record.

FIG. 16 shows the steps performed by the GAP_DET subroutine which determines when a valid gap has been detected. The GAP_DET subroutine 1600 starts in step 1602 which starts a fifteen millisecond timer for a crease check. After the timer is started in step 1604, the subroutine checks to see whether blockette information is being read by the SIO process. If so, the timer stops because there can be no gaps occurring during reading of blockette information. If a blockette is not being read, the subroutine proceeds to step 1608 in which it examines the status of the SIO process to determine if data is being detected. If no data is being detected, timing continues in step 1612 until a predetermined time interval has elapsed.

If no data is detected within the predetermined time interval a valid gap is declared. If data is detected before the predetermined time is reached, then a crease read error is declared in step 1610, error flags are set in step 1614 and the subroutine returns in step 1618. On the other hand, if the predetermined time is reached, a good gap is declared in step 1616 and the subroutine returns in step 1618.

Figure 17:
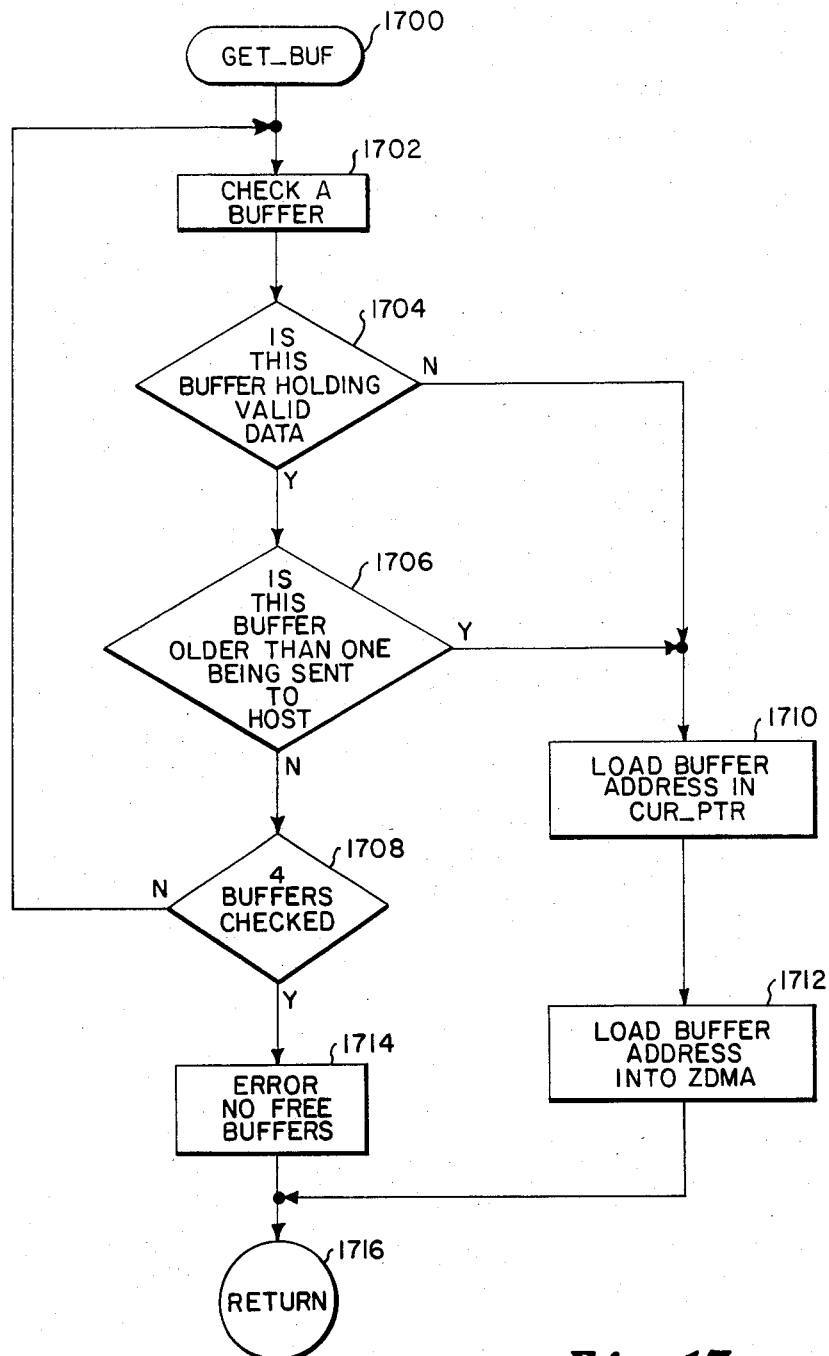
FIG. 17 is a detailed flow chart of the steps performed by a subroutine which selects an empty buffer memory from the buffer chain for transferring data from the tape to the tape controller.

FIG. 17 shows the subroutine GET_BUF. This subroutine finds an available buffer in which to load information read from the tape. GET_BUF routine 1700 starts with step 1702 in which the address stored in the CUR_PTR register is used to access the next buffer in the ring. The flag byte of the buffer specified by the address in the CUR_PTR register is examined for valid data in step 1704. If the buffer does not hold valid data, then, in step 1710, an available buffer has been found and the CUR_PTR register is loaded with that buffer's address. The buffer's address is also loaded into the ZDMA unit for a subsequent transfer in step 1712 and the subroutine returns in step 1716.

If, on the other hand, in step 1704, the next buffer in the chain is found to contain valid data, the GET_BUF subroutine next checks, in step 1706, to determine whether the buffer is "older" than the buffer which is in the process of being sent to the host computer. This is determined by comparing the blockette number in the buffer to the value stored in the CURPBLK register which contains the blockette number of the current buffer being transferred to the host computer.

If the blockette number is less than the number in the CURPBLK register, the subroutine proceeds to step 1710 and loads the address of the buffer into the CUR_PTR register. If the buffer is not older than the one being presently transferred to the host computer, indicating that it contains valid data which needs to be sent to the host, then the subroutine proceeds to step 1708, where it determines whether all four buffers have been checked, if not, it then goes to the next buffer in the ring. If all four buffers have been checked, it then proceeds to step 1714 setting an error flag indicating that there are no free buffers and returns in step 1716.

Figure 18:
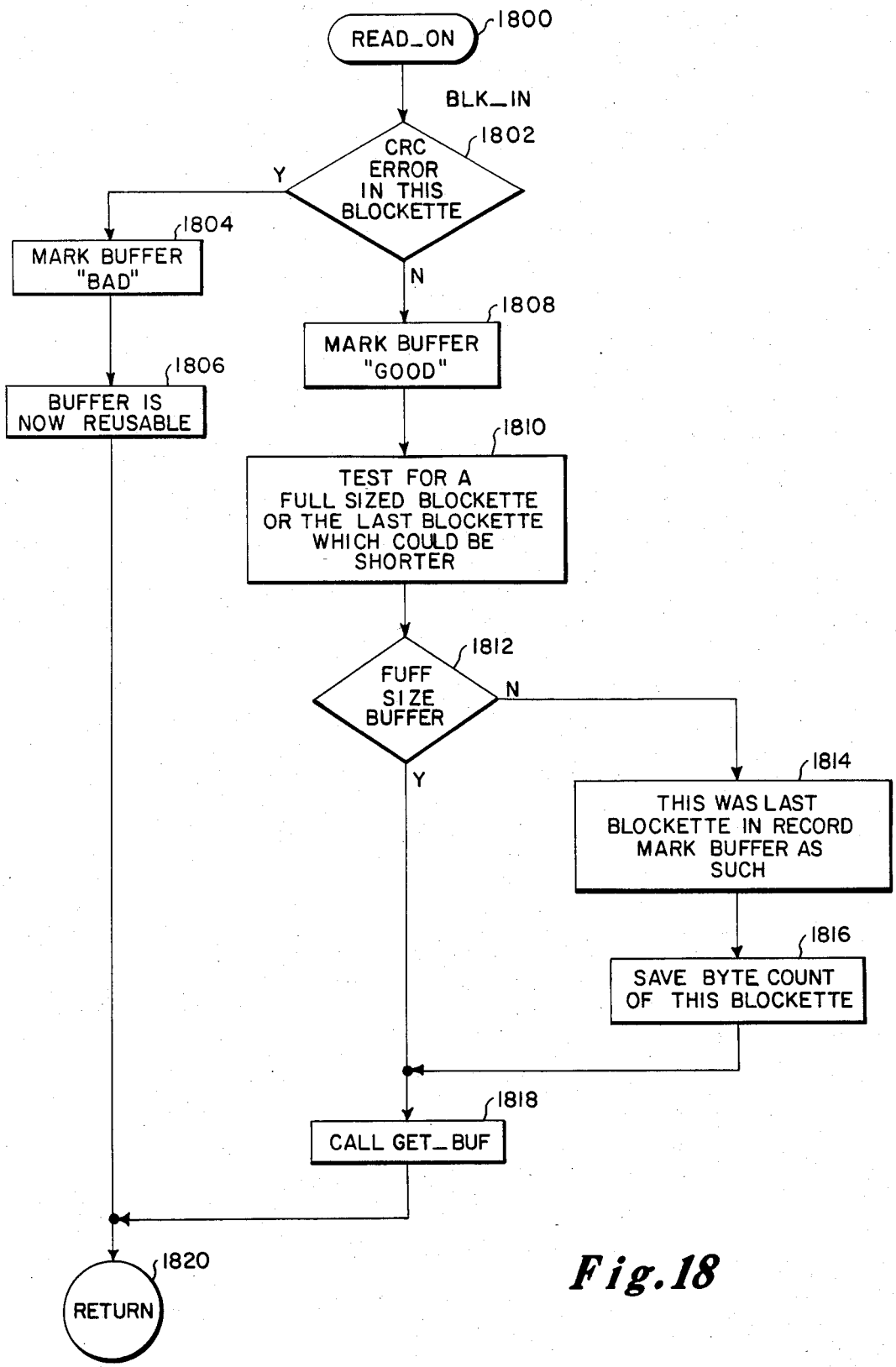
FIG. 18 is a detailed flow chart of the steps performed by a subroutine which is executed when an interrupt occurs, signalling the central processing unit that the transfer of a blockette from the tape into the tape controller has been completed.

In FIG. 18 the steps of the READ_DN interrupt routine are set forth in detail. This interrupt routine is activated upon the completion of the reading of a blockette of information into a buffer from the tape. The interrupt occurs when the read hardware detects a closing flag at the end of a blockette.

The READ_DN routine 1800 starts with step 1802 in which the routine checks the status flags of the SIO circuitry which indicate whether a CRC error was detected in the information just read. If an error is detected, the routine clears the valid data bit in the buffer flag in step 1804 to make the buffer available and returns in step 1820. The presence of a cleared valid data flag indicates that the buffer is now reusable.

If no CRC error in the blockette is found in step 1802, the valid data bit in the buffer status flag is set in step 1808 indicating that the buffer contains valid data. In step 1810, the routine then checks the byte counter in the ZDMA unit to find out whether the blockette was either full-sized or the last blockette in the series which could be of smaller size. If, in step 1812, the buffer is full-sized the GET_BUF subroutine is called in step 1818 to find an available buffer in which to load the next blockette of data. The subroutine then returns to step 1820.

On the other hand, if the buffer which was just read is not full-sized, indicating that it is the last blockette in the record, in step 1814, the end of record bit in the buffer status flag byte is set indicating the blockette is the last blockette in the record and, in step 1816, the byte count of the blockette is saved to load in the PDMA process later. The routine then calls the GET_BUF subroutine in step 1818 and returns in step 1820.

Appendix A attached hereto is a listing of an actual assembly program which performs the routines discussed above and is suitable for use with the illustrative embodiment. This program is written in assembly language for the Z80A microprocessor manufactured by Zilog, Inc., 10340 Bubb Rd., Cupertino, Calif., 95014. The commands used in the program and their operation are explained in detail in the "Z80A CPU Technical Manual" and the "Assembly Language Programming Guide" published by Zilog, Inc.

What is claimed is:

1. Apparatus for serially recording a digital data record on magnetic tape, said apparatus comprising:
   a plurality of memory means,
   means responsive to said data record for storing portions of said data record into at least two of said memory means,
   means for assigning said portion of said data record stored in each of said memory means a unique sequential number, said number being stored in said memory means along with the assigned information, and
   means responsive to said stored information for recording the data record portion stored in each of said memory means serially on said tape in a sequential order specified by the assigned numbers, said recording means comprising a counter for producing a count signal and means responsive to said count signal for recording on said tape the portion of said data record assigned a number equal to said count signal,
   means responsive to a data record portion recorded on said tape for generating read data signals,
   means responsive to said read data signals for detecting a recording error therein, said detecting means comprising means responsive to said data signals for generating a valid signal when said data has been properly recorded on said tape and means responsive to said valid signal for incrementing said counter.

2. Apparatus for serially recording a digital data record on magnetic tape, according to claim 1 wherein said error signal responsive means comprises means responsive to said error signal for decrementing said counter.

3. A method for serially recording a block of digital data temporarily stored in a memory on a continuously moving serial storage medium to allow for error correction comprising the steps of:
   A. dividing said block into a plurality of sub parts, each of said sub parts containing a portion of said information,
   B. assigning unique identification information selected from a set of sequential identification numbers to each of said sub parts, so that each sequential sub part is assigned a corresponding sequential identification number,
   C. recording each of said data sub parts and its associated identification information sequentially on said medium,
   D. after each data part is recorded, immediately reading the information recorded on said medium corresponding to said said recorded part,
   E. determining from said information read from said medium whether a recording error has occurred, and
   F. re-recording the sub part which has an identification number which precedes the number of the sub part last recorded by a predetermined, fixed number on said medium at a position other than the position at which said sub part was originally recorded.

4. A recording method as set forth in claim 3 wherein step C further comprises the steps of:
   C1. recording an identification number on said medium,
   C2. recording a corresponding sub part on said medium immediately following the recording position of said identification number, and
   C3. sequentially recording each of said identification number/sub part pairs in sequential order on said medium.

5. A recording method as set forth in claim 4 wherein step C further comprises the steps of:
   C4. recording error checking information on said medium along with said sub part information.

6. A recording method as set forth in claim 5 wherein step D further comprises the steps of:
   D1. reading the sub part information from said medium, and
   D2. reading from said medium error correction information, including an error correcting code, corresponding to the sub part information read in step D1.

7. A recording method as set forth in claim 6 wherein step E further comprises the steps of:
   E1. computing an error correcting code from said information read in step D1 with the error correcting code read in step D2 to determine whether a recording error has occurred.

8. A recording method as set forth in claim 7 wherein step F further comprises the steps of:
   F1. re-recording said sub part information on said medium at a position upstream from the original position at which said sub part information was recorded, and
   F2. re-recording error correcting information computed from said sub part information re-recorded in step F1 on said medium.

9. A method for serially recording a block of digital data temporarily stored in a memory in a tape recording system which has a continuously moving tape and a single read head and a single write head to allow for error correction comprising the steps of:
   A. dividing said block into a plurality of sub parts, each of said sub parts containing a portion of said information of predetermined length,
   B. assigning a unique identification number selected from a set of sequential identification numbers to each of said sub parts,
   C. recording each of said data sub parts and its assigned identification number sequentially on said tape,
   D. computing an error checking code from the information in said data sub part and recording said error checking code sequentially with said sub part information and said identification number,
   E. after each data part is recorded, immediately reading the information recorded on said tape corresponding to said said recorded sub part and said recorded error checking code,
   F. calculating a new error checking code from said sub part information read from said tape
   G. comparing said new error checking code with said error checking code read from said tape to determine whether a recording error has occurred,
   H. recording previously recorded sub parts and additional sub parts on said tape starting with the sub part which has a first identification that which precedes the number of the sub part last recorded by a predetermined, fixed number, and
   I. recording on said tape sequentially with each of said recorded sub parts an identification number selected from a set of sequential identification numbers, said set of sequential identification numbers starting with said first identification number.

10. A method for recording digital data on a serial storage medium and for reading said data from said medium to allow for error correction comprising the steps of:
   A. dividing said data into a plurality of sub parts, each of said sub parts containing a portion of said data,
   B. recording said data sub parts and unique identifier information for each of said sub parts sequentially on said medium,
   C. detecting recording errors in sub parts recorded on said medium,
   D. recording at least one duplicate sub part on said medium for each erroneously-recorded sub part,
   E. reading said information sequentially from said medium and dividing said information read from said medium into sub parts corresponding to the sub parts written on said medium,
   F. determining from information read from said medium in step E whether a data recording error has occurred in a particular sub part,
   G. marking a read data sub part which contains no recording error as valid, and
   H. assembling said digital data from read data sub blocks containing valid information utilizing said identifier information.

11. A recording method as set forth in claim 10 wherein step B further comprises the steps of:
   B1. assigning each of said subparts a unique identification number,
   B2. recording said number sequentially with said sub part on said medium.

12. A recording method as set forth in claim 10 wherein step C further comprises the steps of:

C1. after each sub part is recorded, immediately reading the information recorded on said medium corresponding to said said recorded part, and C2. determining from said information read from said medium whether a recording error has occurred.

13. A recording method as set forth in claim 10 wherein step D further comprises the steps of:

D1. storing the information in each sub part in a memory prior to writing the information on said medium, D2. upon detection of an error in a recorded sub part, reading the corresponding sub part information out of the memory, and D3. recording the information read out of the memory in step D2 on said medium at a position downstream of the position at which said sub part was originally recorded.

14. A recording method as set forth in claim 10 wherein step E further comprises the steps of:

E1. reading each sub part into a temporary storage in the order in which the sub part are written on said medium, and E2. reading said unique identifier information into a portion of said temporary storage associated with the corresponding data sub part.

15. A recording method as set forth in claim 10 wherein step H further comprises thb steps of:

H. retrieving said data sub parts from said temporary storage in a selected order so that the identifier information associated with the retrieved sub parts is in the same order as assigned to the original data information.

16. A method for serially recording a block of digital data temporarily stored in a memory on a continuously moving serial storage medium and subsequently reading information from said medium to allow for error correction comprising the steps of:

A. dividing said block into a plurality of sub parts, each of said sub parts containing a portion of said information, B. assigning unique identification information to each of said sub parts, C. recording each of said data sub parts and its associated identification information sequentially on said medium, D. after each data part is recorded, immediately reading the information recorded on said medium corresponding to said said recorded part, E. determining from said information read from said medium whether a recording error has occurred, and F. re-recording an erroneously-recorded sub part on said medium at a position other than the position at which said sub part was originally recorded.

G. subsequently reading said information sequentially from said medium and dividing said information read from said medium into sub parts corresponding to the sub parts written on said medium, H. determining from information read from said medium in step G whether a data recording error has occurred in a particular sub part, I. marking a read data sub part which contains no recording error as valid, and J. assembling said digital data from read data sub blocks containing valid information utilizing said identifier information.

17. A recording method as set forth in claim 16 wherein step B further comprises the steps of:

B1. selecting an identification number from a set of sequential identification numbers, and B2. assigning said selected number a one of said sub parts so that each sequential sub part is assigned a corresponding sequential identification number.

18. A recording method as set forth in claim 17 wherein step C further comprises the steps of:

C1. recording an identification number on said medium,

C2. recording a corresponding sub part on said medium immediately following the recording position of said identification number, and C3. sequentially recording each of said identification number/sub part pairs in sequential order on said medium.

19. A recording method as set forth in claim 18 wherein step C further comprises the steps of:

C4. recording error checking information on said medium along with said sub part information.

20. A recording method as set forth in claim 19 wherein step D further comprises the steps of:

D1. reading the sub part information from said medium, and

D2. reading from said medium error correction information, including an error correcting code, corresponding to the sub part information read in step D1.

21. A recording method as set forth in claim 20 wherein step E further comprises the steps of:

E1. computing an error correcting code from said information read in step D1, and E2. comparing the code computed in step E1 with the error correcting code read in step D2 to determine whether a recording error has occurred.

22. A recording method as set forth in claim 21 wherein step F further comprises the steps of:

F1. re-recording said sub part information on said medium at a position downstream from the original position at which said sub part information was recorded, and F2. re-recording error correcting information computed from said sub part information re-recorded in step F1 on said medium.

23. A method for serially recording a block of digital data temporarily stored in a memory in a tape recording system which has a continuously moving tape, a single read head and a single write head to allow for error correction comprising the steps of:

A. dividing said block into a plurality of sub parts, each of said sub parts being of predetermined length and containing a portion of said information, B. assigning a unique identification number selected from a set of sequential identification numbers to each of said sub parts, C. recording each of said data sub parts and its assigned identification number sequentially on said tape, D. computing an error checking code from the information in said data sub part and recording said error checking code sequentially with said sub part information and said identification number, E. after each data part is recorded, immediately reading the information recorded on said tape corresponding to said said recorded sub part and said recorded error checking code, F. calculating a new error checking code from said sub part information read from said tape, G. comparing said new error checking code with said error checking code read from said tape to determine whether a recording error has occurred, H. re-recording an erroneously-recorded sub part on said tape at a position other than the position at which said sub part was originally recorded, and I. re-recording on said tape the same identification number associated with said erroneously recorded sub part sequentially with said re-recorded sub part, J. subsequently reading said information sequentially from said medium into a plurality of buffer stores of predetermined length so that said information read from said medium is divided into sub parts corresponding to the sub parts originally written on said medium, K. calculating a new error checking code from said sub part information read from said tape in step J, L. comparing said new error checking code determined in step K to the error checking code stored on said tape with each data sub part to determine whether a data recording error has occurred in a particular sub part, L. marking a read data sub part which contains no recording error as valid, and M. assembling said digital data from read data sub blocks containing valid information utilizing said identifier informatinn.

24. A recording method as set forth in claim 21 wherein step M further comprises the steps of:

M1. reading information out of buffer stores containing valid information in an order determined by the associated identification numbers so that the associated identification numbers are in sequence.

25. Apparatus for recording digital data on a serial medium to allow for error correction comprising, means responsive to said data for dividing said data into a plurality of sub parts, each of said sub parts containing a portion of said data, means responsive to said sub part information for recording said each of said data sub parts and a unique sequential identification numbers on said medium, said sub parts and associated identification numbers being recorded sequentially on said medium, means responsive to said recorded data information for detecting recording errors in sub parts recorded on said medium, and means responsive to the detection of a recording error for recording a duplicate sub part with the identification number preceding the identification number of the sub part last recorded by a predetermined, fixed amount on said medium for each erroneously-recorded sub part.

26. Recording apparatus as set forth in claim 25 wherein said error detecting means comprises, means operable after each sub part is recorded for immediately reading the information recorded on said medium corresponding to said said recorded part, and means responsive to information read from said medium for determining whether a recording error has occurred.

27. Recording apparatus as set forth in claim 25 wherein said means for recording a duplicate sub part comprises, means responsive to information in said sub parts for storing the information in each sub part in a memory prior to writing the information on said medium, means responsive to the detection of an error in a recorded sub part for reading the sub part information associated with the identification number preceding the identification number of the sub part last recorded by a predetermined, fixed amount out of the memory, and means responsive to information read out of said memory for recording the information read out of the memory on said medium at a position upstream of the position at which said sub part was originally recorded.

28. Apparatus for serially recording a block of digital data temporarily stored in a memory on a continuously moving serial storage medium to allow for error correction comprising, means responsive to said information for dividing said block into a plurality of sub parts, each of said sub parts containing a portion of said information, means for assigning unique identification information to each of said sub parts, means responsive to said sub part information and to said assigned identification information for recording each of said data sub parts and its associated identification information sequentially on said medium, means operable after each data part is recorded, for immediately reading the information recorded on said medium corresponding to said said recorded data part and said identification information, means responsive to said information read from said medium for determining whether a recording error in the data and the identification number of a sub part has occurred, and means responsive to a recording error in an erroneously recorded sub part for re-recording a plurality of sequential sub parts starting with the sub part having an associated identification number preceding the identification number of the sub part last recorded by a predetermined, fixed amount on said medium at a position other than the position at which said erroneously-recorded sub part was originally recorded.

29. Recording apparatus as set forth in claim 28 wherein said dividing means comprises, means for selecting an indentification number from a set of sequential indentification numbers, and means for assigning said selected number to one of said sub parts so that each sequential sub part is assigned a corresponding sequential identification number.

30. Recording apparatus as set forth in claim 29 wherein said recording means comprises, means responsive to a selected identification number for recording said identification number on said medium, means for recording a corresponding sub part on said medium immediately following the recording position of said identification number, and means for sequentially recording each of said identification number/sub part pairs in sequential order on said medium.

31. Recording apparatus as set forth in claim 30 wherein said recording means further comprises, means for recording error checking information on said medium along with said sub part information.

32. Recording apparatus as set forth in claim 31 wherein said reading means comprises,
 means responsive to information recorded on said medium for reading the sub part information from said medium, and
 means responsive to information recorded on said medium for reading from said medium error correction information, including an error correcting code, corresponding to the sub part information read from said medium.

33. Recording apparatus as set forth in claim 32 wherein said reading means further comprises,
 means for computing an error correcting code from said information read from said medium with the error correcting code read from said medium to determine whether a recording error has occurred.

34. Recording apparatus as set forth in claim 33 wherein said re-recording means comprises,
 means for re-recording said sub part information having an associated identification number preceding the identification number of the sub part last recorded by a predetermined, fixed amount on said medium at a position upstream from the original position at which said sub part information was recorded, and
 means for re-recording error correcting information computed from said sub part information re-recorded on said medium.

35. Apparatus for serially recording a block of digital data temporarily stored in a memory in a tape recording system which has a continuously moving tape and a single read head and a single write head to allow for error correction comprising,
 means responsive to said information for dividing said block into a plurality of sub parts, each of said sub parts containing a portion of said information of predetermined length,
 means responsive to said sub part information for assigning a unique identification number selected from a set of sequential identification numbers to each of said sub parts,
 means responsive to said sub part information and to said identification information for recording each of said data sub parts and its assigned identification number sequentially on said tape,
 means responsive to said sub part information for computing an error checking code from the information in said data sub part and recording said error checking code sequentially with said sub part information and said identification number,
 means operable after each data part is recorded for immediately reading the information recorded on said tape corresponding to said said recorded sub part and said recorded error-checking code,
 means responsive to said sub part information read from said tape for calculating a new error checking code,
 means responsive to said error checking code read from said tape and to said new error checking code for comparing said new error checking code with said error checking code read from said tape to determine whether a recording error has occurred,
 means responsive to the determination that an error has occurred in an erroneously-recorded sub part for re-recording on said tape at a position other than the position at which said erroneously-recorded sub part was originally recorded, a plurality of sub parts starting with the sub part having an associated identification number preceding the identification number of the sub part last recorded by a predetermined, fixed amount, and
 means responsive to the determination that an error has occurred for re-recording on said tape the same identification numbers that were associated with said re-recorded sub parts when said sub parts were originally recorded.

36. An error correcting system for recording digital data on, and for reading said data from, a serial storage medium comprising,
 means responsive to said data for dividing said data into a plurality of sub parts, each of said sub parts containing a portion of said data,
 means for assigning each of said sub parts a unique identification number,
 means responsive to said sub part information for recording said data sub parts and a unique identification number for each of said sub parts sequentially on said medium,
 means responsive to said recorded data information for detecting recording errors in sub parts recorded on said medium, and
 means responsive to the detection of a recording error for recording duplicate sub parts starting with the sub part having an associated identification number preceding the identification number of the sub part last recorded by a predetermined, fixed amount on said medium for each erroneously-recorded sub part,
 means for reading said information sequentially from said medium and dividing said information read from said medium into sub parts corresponding to the sub parts written on said medium,
 means responsive to information read from said medium for determining whether a data recording error has occurred in a particular sub part and for generating a valid data signal if no error is detected,
 means responsive to said valid data signal for marking a read data sub part as valid, and
 means responsive to information read from said medium for assembling said digital data from read data sub blocks containing valid information utilizing said identifier information.

37. An error-correcting system as set forth in claim 36 wherein said dividing means comprises a plurality of buffer stores, each a said stores having a predetermined storage capacity and means for loading portions of said data sequentially into each of said stores.

38. An error-correcting system as set forth in claim 37 wherein said buffer stores are linked together to form a large storage area of capacity equal to the length of said digital information.

39. An error-correcting system as set forth in claim 36 wherein said means for recording an identification number on said medium further comprises,
 means for recording a corresponding sub part on said medium immediately following the recording position of said identification number, and
 means for sequentially recording each of said identification number/sub part pairs in sequential order on said medium.

40. An error-correcting system as set forth in claim 36 wherein said error detecting means comprises,
 second means operable after each sub part is recorded, for immediately reading the information recorded on said medium corresponding to said recorded part, and means responsive to information read from said medium for determining whether a recording error has occurred.

41. An error-correcting system as set forth in claim 36 wherein said means for recording duplicate sub parts comprises, means for storing the information in each sub part in a memory prior to writing the information on said medium, means responsive to detection of an error in a recorded sub part, for reading the corresponding sub part information out of the memory, and means responsive to said information read out of the memory for recording said information on said medium at a position downstream of the position at which said sub part was originally recorded.

42. An error-correcting system as set forth in claim 36 wherein said first reading means comprises, means for reading each sub part recorded on said medium into a temporary storage in the order in which the sub parts are written on said medium, and means for reading said unique identifier information into a portion of said temporary storage associated with the corresponding data sub part.

43. An error-correcting system as set forth in claim 36 wherein said assembling means comprises, means for retrieving said data sub parts from said temporary storage in a selected order so that the identifier information associated with the retrieved sub parts is in the same order as assigned to the original data information.

* * * * *